(12) United States Patent
Sachs et al.

(10) Patent No.: US 8,948,137 B2
(45) Date of Patent: *Feb. 3, 2015

(54) INTERNETWORKING OF CELLULAR RADIO NETWORKS AND WIRELESS DATA NETWORKS

(75) Inventors: Joachim Sachs, Aachen (DE); Ian Herwono, Ipswich (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 641 days.

This patent is subject to a terminal disclaimer.

(21) Appl. No.: 13/198,116

(22) Filed: Aug. 4, 2011

(65) Prior Publication Data

US 2011/0292914 A1    Dec. 1, 2011

Related U.S. Application Data

(63) Continuation of application No. 11/913,020, filed as application No. PCT/SE2005/000623 on Apr. 29, 2005, now Pat. No. 8,023,469.

(51) Int. Cl.
*H04W 36/30* (2009.01)
*H04W 40/36* (2009.01)
*H04W 36/00* (2009.01)
*H04W 36/14* (2009.01)

(52) U.S. Cl.
CPC .......... *H04W 40/36* (2013.01); *H04W 36/0016* (2013.01); *H04W 36/14* (2013.01)
USPC ........................................ 370/332; 455/436

(58) Field of Classification Search
USPC ........................ 370/331, 332, 338; 455/436
See application file for complete search history.

(56) References Cited

U.S. PATENT DOCUMENTS

| | | | |
|---|---|---|---|
| 2004/0196793 A1* | 10/2004 | Lucidarme et al. | 370/252 |
| 2004/0248575 A1* | 12/2004 | Rajala et al. | 455/436 |
| 2005/0073977 A1* | 4/2005 | Vanghi et al. | 370/335 |
| 2005/0075074 A1* | 4/2005 | Benson et al. | 455/67.11 |
| 2006/0056348 A1* | 3/2006 | Marinier et al. | 370/331 |
| 2006/0223535 A1* | 10/2006 | Das et al. | 455/436 |
| 2006/0229073 A1* | 10/2006 | Das et al. | 455/436 |
| 2009/0131053 A1 | 5/2009 | Sachs et al. | |

* cited by examiner

*Primary Examiner* — Brian D Nguyen

(57) ABSTRACT

A method is disclosed for assisting a handover of a data session from a first routing path, associated with a first access network, to an alternative routing path, associated with an alternative access network. Data is routed over the first access network to a UT by binding a session identifier to a first routing identifier. The session identifier and the first routing identifier are defined in accordance with a standard protocol routing scheme of the first access network. The method comprises receiving a capability message uniquely identifying the UT according to both a standard protocol routing scheme of said first access network, and an alternative standard protocol routing scheme of said alternative access network. The method further comprises creating an alternative routing identifier complying with the alternative standard protocol routing scheme, associating the alternative routing identifier with the UT, and associating the session identifier with the alternative routing identifier.

54 Claims, 11 Drawing Sheets

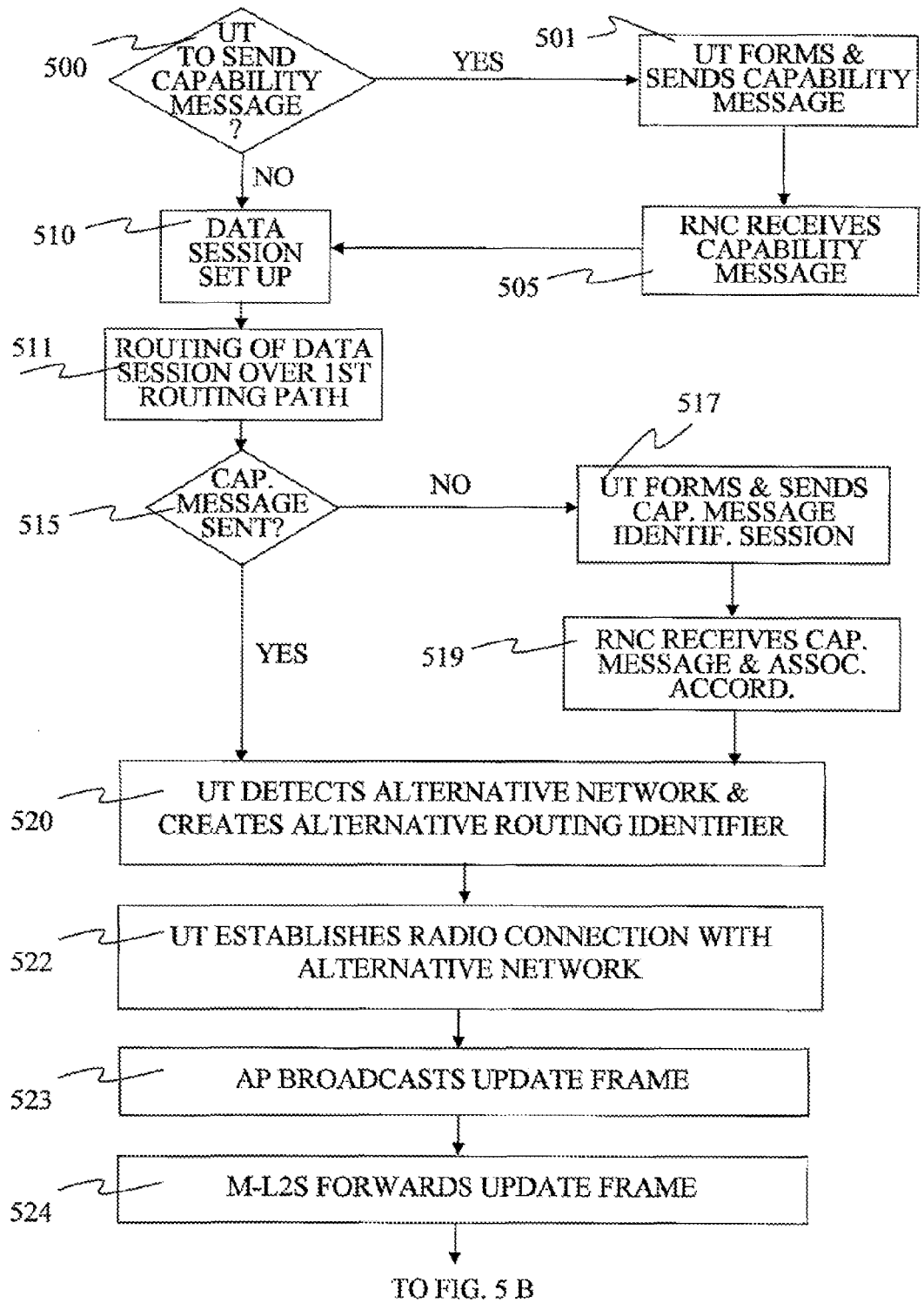

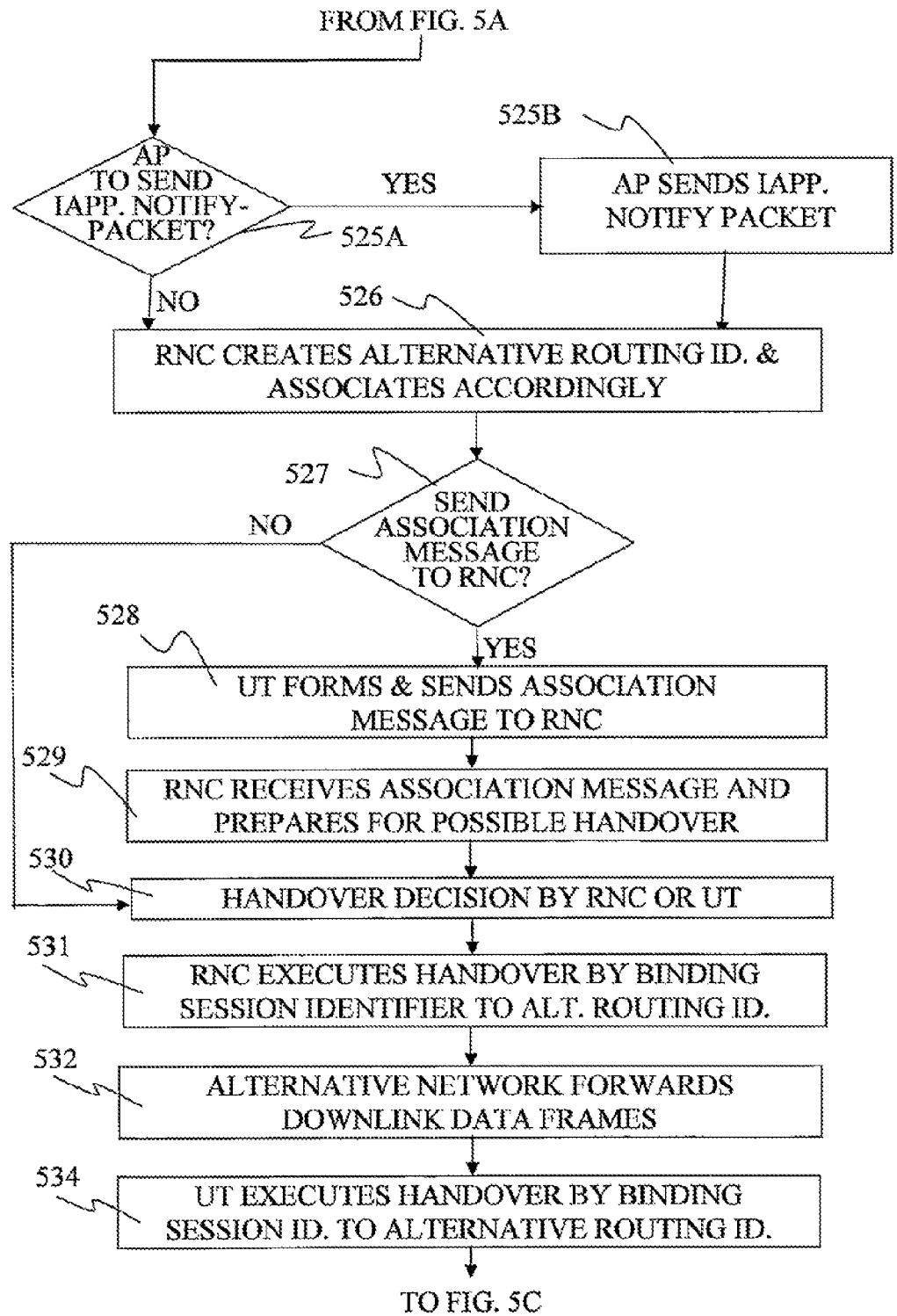

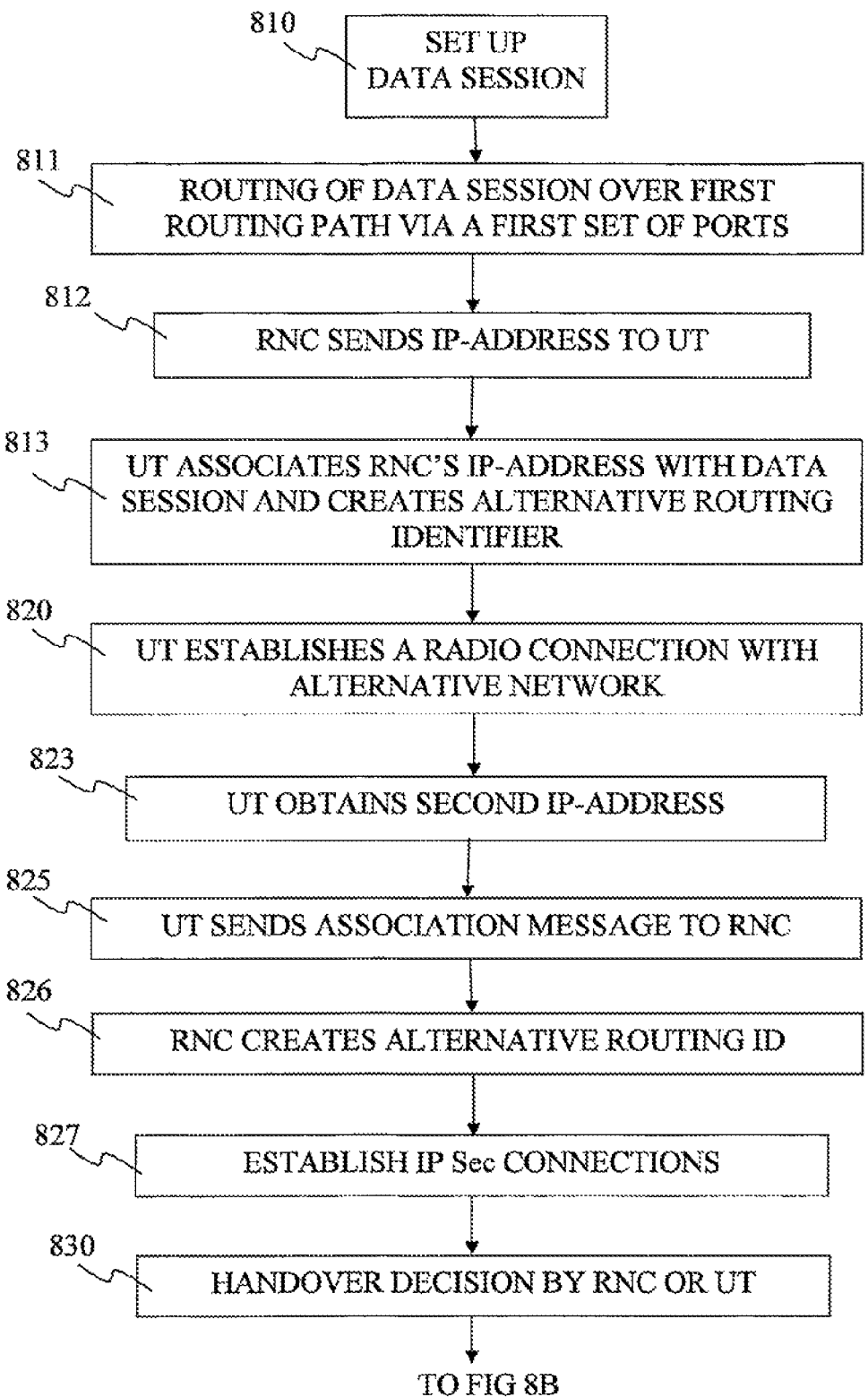

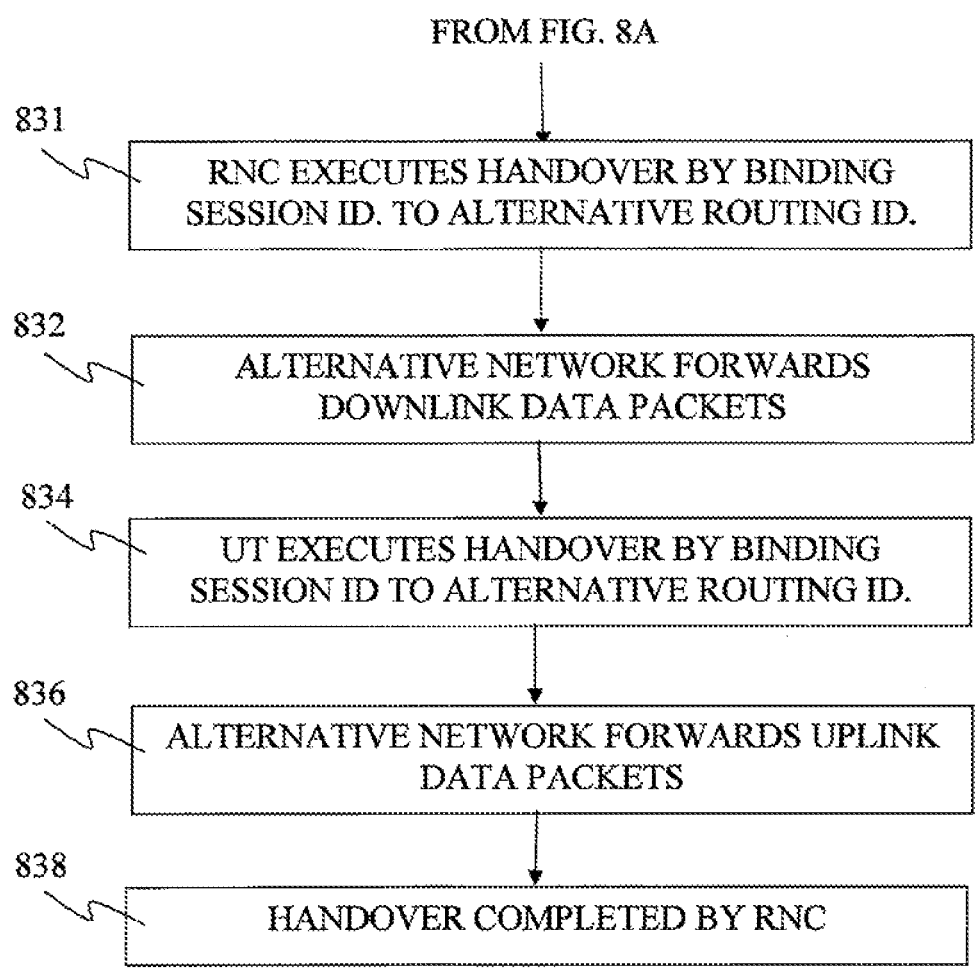

INTERNETWORKING OF CELLULAR RADIO NETWORKS AND WIRELESS DATA NETWORKS

CROSS-REFERENCE TO RELATED APPLICATIONS

This application is a continuation of U.S. application Ser. No. 11/913,020, filed Oct. 29, 2007, issued as U.S. Pat. No. 8,023,469, which was the National Stage of International Application No. PCT/SE05/00623, filed Apr. 29, 2005, the disclosure of which is incorporated herein by reference.

TECHNICAL FIELD OF THE INVENTION

The invention relates generally to the internetworking of cellular radio networks and wireless data networks, and more specifically to means and methods regarding the radio resource management of such integrated networks.

BACKGROUND

FIG. 1 illustrates the basic architecture of a cellular radio network in form of a UTRAN (Universal Terrestrial Radio Access Network) network, connected to the Internet 170 and a WLAN. The WLAN normally comprises at least one radio Access Point, AP, 165 normally connected to an Access Point Controller, APC, 162. The cellular radio network comprises a GGSN 110 connected to a SGSN 120 which in turn is connected to a RNC 130. A dual mode UT (User Terminal) 140, having both UTRAN and WLAN capability, can establish a UTRAN radio connection through its first data port 141 with Base station Node B 150 and a WLAN radio connection through its second data port 142 with the AP 165 of the WLAN. Node B 150 is connected to RNC 130. The WLAN may in a conventional manner be connected to the SGSN 120 or to the GGSN 110 or to the Internet 170, FIG. 1 illustrates the case wherein it is connected to the GGSN 110, possibly via an AR (Access Router) and/or an IP-network, not illustrated in FIG. 1. A data communication session can be established between the UT 140 and a communicating party connected to the Internet 170. The data communication session may in a conventional manner be realised by a PDP (Packet Data Protocol) context session between the UT 140 and the GGSN 110, in accordance with the 3GPP standard for packet radio data services.

In case of a handover of a PDP context session from the UTRAN routing path to the WLAN routing path, a lot of signalling is needed and high delays are expected if a lossless handover should be performed since the user data, i.e. downlink PDP-IP-packets, that have been sent to and cached in the corresponding UTRAN node, i.e. the RNC 130, but not yet transmitted to the user terminal UT must be forwarded back across the UMTS (Universal Mobile Terrestrial System) core network, i.e back to the GGSN 110, to be routed further to the UT 140 via the APC 162 and AP 165.

Another problem is that the cellular radio access network, i.e the RNC 130, in the network architecture illustrated in FIG. 1 has no access to the wireless data network's, i.e. the WLAN's, radio resource management information, and the WLAN has no access to the cellular radio network's radio resource management information, hindering an efficient multi radio resource management of the entire integrated UTRAN-WLAN network.

None of the above identified problems are admitted by the applicant to constitute prior art.

SUMMARY OF THE INVENTION

The present invention seeks to overcome/solve above problems. It is an object of the invention is to provide means and methods allowing an effective and efficient Multi Radio Resource Management functionality, MRRM, in a cellular radio network, e.g. a UTRAN, being integrated with an alternative wireless data network, e.g. a Layer 2 Radio Access Networks such as a WLAN or a WLAN-IP-Network.

One object of the present invention is thus to dynamically control to which radio access network a UT is to be connected, based on e.g. the overall traffic load, cell load, radio link quality etc., in such an integrated network.

One object of the present invention is to provide a method and means allowing a smooth and seamless handover of a data session, e.g. a PDP context session, from a cellular radio network routing path to an alternative wireless data network routing path, such as e.g. from a UTRAN routing path to a WLAN routing path or a WLAN-IP-Network routing path, and vice versa.

Another object is to reduce the overall network signalling in an integrated network comprising a cellular radio network and an alternative wireless data network during a handover of a data session, e.g. a PDP context session, from a cellular network routing path to an alternative data network routing path, such as e.g. from a UTRAN routing path to a WLAN routing path or a WLAN-IP-Network, and vice versa.

Still another object is to reduce the risk of packet loss and minimize the delay of packets during such handoffs.

According to a first aspect, the invention provides a Radio Network Controller, RNC, for assisting a handover of a data session from a first routing path, associated with a first access network and a first data port of said RNC, to an alternative routing path, associated with an alternative access network and a second data port of said RNC, said RNC arranged to route data of said session over said first access network via said first data port, to a User Terminal, UT, by binding a session identifier identifying said data session to a first routing identifier, wherein said session identifier and said first routing identifier are defined in accordance with a standard protocol routing scheme of said first access network, said RNC further arranged to carry out the following steps:

- receiving a capability message uniquely identifying said UT according to a standard protocol routing scheme of said first access network and according to an alternative protocol routing scheme of said alternative access network, said capability message indicating that said UT is capable of establishing a data session through said alternative access network,
- creating an alternative routing identifier for said session complying with the protocol routing scheme of said alternative access network and associating said alternative routing identifier with said UT and said second port, and,
- associating at least said session identifier with said alternative routing identifier.

In one embodiment, the RNC is arranged to route said data session wherein said first access network is a cellular radio network, said first routing identifier is a radio bearer identity, and wherein said radio bearer identity and session identifier are defined by a cellular radio network standard protocol routing scheme, and wherein said capability message comprises a network address, NA, associated with said UT, in accordance with a standard protocol routing scheme of said alternative access network.

In one embodiment, the RNC is further arranged to carry out the following steps:
- receiving a capability message identifying said data session, and comprising said NA,
- associating said specific data session with said NA.

In one embodiment, the RNC is further arranged to carry out the following steps:
- receiving an association message comprising said NA, said message indicating that there is an established radio communication connection between said UT and said alternative access network associated with said second port,
- associating said NA with said second data port,
- creating an alternative radio bearer identity defining a data communication connection between said RNC and said UT for said session, through said alternative access network via said second port,
- defining said alternative routing identifier to be said alternative radio bearer identity,
- associating said alternative radio bearer identity with said session identifier, said NA and said second port,
- deciding to route said data session to said UT through said alternative routing path, via said second data port through said alternative access network,
- binding said session identifier to said alternative radio bearer identity, thereby routing data of said session through said alternative routing path, via said second port through said alternative access network.

In one embodiment, said association message uniquely identifies said specific data session.

In one embodiment, the RNC is further arranged to carry out the following steps:
- receiving a radio resource management (RRM) message comprising RRM information regarding said alternative access network and/or said cellular radio network,
- extracting said RRM information from said message,
- updating stored RRM information with said extracted RRM information,
- deciding to route said data session to said UT through said alternative access network routing path based on said updated RRM information.

In one embodiment, the RNC is further arranged to carry out the following step:
- extracting said RRM information in said RRM message by means of an installed Inter Access Point Protocol (IAPP) or an installed Internet Protocol (IP).

In one embodiment, the RNC is further arranged to carry out the following steps:
- receiving said capability message on said first port, wherein said message uniquely identifies said first radio bearer identity,
- establishing that said NA in said capability message is defined as a Wireless Data Network Address (WDNA) in accordance with a standard protocol routing scheme of a Wireless Data Network, and extracting said WDNA from said capability message,
- receiving said association message on said second port, wherein said message comprises said WDNA.

In one embodiment, said standard protocol routing scheme of said alternative access network is a protocol according to the IEEE 802 standard protocol family and said NA is a MAC-address of said UT.

In one embodiment, said data session is associated with a first IP-address of said UT, and said RNC is further arranged to carry out the following steps:
- receiving said capability message on said first port, wherein said message uniquely identifies said first radio bearer identity,
- establishing that said NA in said capability message is defined as a second IP-address, or as a Security Association in combination with said second IP-address, allocated said UT, and extracting said second IP-address from said capability message,
- receiving said association message on said second port, wherein said message comprises said second IP-address.

In one embodiment, said second IP-address is a mobile IP-address (IPm) and said data session is routed over said alternative data network path by means of an IPSec protocol (IP Security Protocol).

In one embodiment, said cellular radio network standard protocol routing scheme is defined by a UTRAN (Universal Terrestrial Radio Access Network) standard protocol, said data session is a PDP (Packet Data Protocol) context session complying with the 3GPP standard, said data session identifier is a 3GPP (3:rd Generation Partnership Project) TEID (Tunnel Endpoint Identifier) of a routing tunnel between said RNC and a gateway support node for said data session, and said first radio bearer identity is a Radio Access Bearer Identity (RAB ID) or a Radio Bearer Identity (RB ID) complying with the 3GPP standard.

In one embodiment, the RNC is further arranged to carry out the following steps:
- receiving an inter-RNC handover request to switch said data session to a second target RNC,
- transferring at least said alternative routing identifier to said second RNC.

According to a second aspect, the invention provides a method to be used by a User Terminal, UT, for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, wherein said UT is arranged to route data of said data session to a Radio Network Controller, RNC, over said first routing path by binding said session identifier to said first routing identifier, said first routing identifier associated with said UT at said RNC, said method comprising the following steps:
- forming a capability message uniquely identifying said UT according to a standard protocol routing scheme of said first access network and according to a protocol routing scheme of said alternative radio access network, said message indicating that said UT is capable of establishing a data session through said alternative radio access network, and,
- sending said capability message to said RNC over said first or alternative routing path.

In one embodiment, said first radio access network is a cellular radio network, said alternative radio access network is a wireless data network, said session identifier and said first routing identifier are radio bearer identities defined by a cellular radio network standard protocol routing scheme, and wherein said alternative routing identifier is associated with a network address, NA, of said UT, wherein said NA is defined in accordance with a standard protocol routing scheme of said wireless data network.

In one embodiment, said capability message is sent to, said RNC (230) over a cellular radio network routing path via said first data port (241).

In one embodiment, the method further comprises the following steps:
- forming said capability message so that it comprises said NA and uniquely identifies said data session,
- sending said capability message to said RNC.

In one embodiment, the method further comprises the following steps:
- establishing a radio communication connection with said alternative wireless data network via said second port,
- forming an association message comprising said NA, said message indicating that there is an established radio communication connection between said UT and said alternative radio access network,
- sending said association message to said RNC.

In one embodiment, the method further comprises the following steps:
- receiving a message comprising a Network Source Address (NSA) associated with said RNC and said alternative routing path,
- extracting said NSA from said message,
- associating said session identifier with said alternative routing identifier, with said NSA and with said second port,
- deciding to route data of said session through said alternative radio access network routing path via said second port,
- binding said session identifier to said alternative routing identifier, thereby routing data of said session through said alternative radio access network routing path via said second port.

In one embodiment, the method further comprises the following steps:
- measuring Radio Resource Management, RRM, parameters regarding said alternative wireless data network and/or said cellular radio network,
- forming a RRM message comprising measured parameter values for said RRM parameters,
- sending said RRM message to said RNC.

In one embodiment, said NA and said NSA are MAC network addresses complying with the IEEE 802 standard protocol addressing scheme.

In one embodiment, said data session is associated with a first IP-address of said UT, said NSA is defined as an IP-address and said method further comprises the following steps:
- receiving, on said second port, a message comprising a second IP address allocated said UT,
- defining said second IP-address to said NA,
- associating said alternative routing identifier with said second IP-address,
- forming said association message so that it comprises said second IP address and so that it identifies said data session,
- sending said association message to said RNC.

In one embodiment, said second IP-address is a secure IP-address (IPSec) according to an IP-security protocol.

According to a third aspect, the invention provides a User Terminal, UT, for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, said UT arranged to route data of said data session to a Radio Network Controller, RNC, over said first routing path by binding said session identifier to said first routing identifier, said first routing identifier associated with said UT at said RNC (230), wherein said UT (240) is further equipped with means to carry out the method according to the second aspect of the invention.

According to a fourth aspect, the invention provides a computer program comprising program code means which, when loaded into a processing means of a User Terminal, UT, make said processing means execute at least one procedure realising the method according to the second aspect of the invention.

According to a fifth aspect, the invention provides a computer readable medium having stored program code means which, when loaded into a processing means of a User Terminal, UT, (240), make said processing means execute at least one procedure realising the method according to the second aspect of the invention. According to a sixth aspect, the invention provides a method to be used by a Radio Network Controller, RNC, for assisting a handover of a data session from a first routing path, associated with a first access network and a first data port of said RNC, to an alternative routing path, associated with an alternative access network and a second data port of said RNC, wherein said RNC is arranged to route data of said session over said first access network via said first data port, to a User Terminal, UT, by binding a session identifier identifying said data session to a first routing identifier, wherein said session identifier and said first routing identifier are defined in accordance with a standard protocol routing scheme of said first access network, said method comprising the following steps:
- receiving a capability message uniquely identifying said UT according to a standard protocol routing scheme of said alternative access network, said capability message indicating that said UT is capable of communicating data of said session through said alternative access network,
- creating an alternative routing identifier for said session complying with the standard protocol routing scheme of said alternative access network and associating said alternative routing identifier with said UT and said second port, and,
- associating at least said session identifier with said alternative routing identifier.

In one embodiment, said first access network is a cellular radio network, said first routing identifier is a radio bearer identity, and wherein said radio bearer identity and session identifier are defined by a cellular radio network standard protocol routing scheme, and wherein said capability message comprises a network address, NA, associated with said UT, in accordance with said standard protocol routing scheme of said alternative access network.

In one embodiment, the method of the invention further comprises the following steps:
- receiving a message identifying said data session, and comprising said NA,
- associating said specific data session with said NA.

In one embodiment, the method of the invention further comprises the following steps:
- receiving an association message comprising said NA, said message indicating that there is an established radio communication connection between said UT and said alternative access network associated with said second port, associating said NA with said second data port, creating an alternative radio bearer identity defining a data communication connection between said RNC and said UT for said session, through said alternative access network via said second port, defining said alternative routing identifier to be said alternative radio bearer identity, associating said session identifier with said alternative radio bearer identity, said NA and said second port, deciding to route said data session to said UT through said alternative routing path, via said second data port through said alternative access network, binding said session identifier to said alternative radio bearer identity, thereby routing data of said session through said alternative routing path, via said second port through said alternative access network.

The method according to claim 25 further comprising the following steps:

receiving a radio resource management (RRM) message comprising RRM information regarding said alternative access network and/or said cellular radio network, extracting said RRM information from said message, updating stored RRM information with said extracted RRM information, deciding to route said data session to said UT through said alternative access network routing path based on said updated RRM information.

In one embodiment, the method according to the invention further comprises the following step:

extracting said RRM information in said RRM message by means of an installed Inter Access Point Protocol (IAPP) or an installed Internet Protocol (IP).

In one embodiment, the method according to the invention further comprises the following steps:

receiving said capability message on said first port, wherein said message uniquely identifies said first radio bearer identity, establishing that said NA in said capability message is defined as a Wireless Data Network Address (WDNA) in accordance with a standard protocol routing scheme of a Wireless Data Network, and extracting said WDNA from said capability message, receiving said association message on said second port, wherein said message comprises said WDNA.

In one embodiment said standard protocol routing scheme of said alternative network is a protocol according to the IEEE 802 standard protocol family and said NA is a MAC-address of said UT.

In one embodiment, said data session is associated with a first IP-address of said UT, said method further comprising the following steps:

receiving said capability message on said first port; wherein said message uniquely identifies said first radio bearer identity, establishing that said NA in said capability message is defined as a second IP-address allocated said UT, and extracting said second IP-address from said capability message, receiving said association message on said second port, wherein said message comprises said second IP-address.

In one embodiment, said IP-address is a mobile IP-address (IPm) and said standard protocol routing scheme of said alternative data network is an Internet Protocol for mobile applications (MIP, Mobile IP).

In one embodiment, said cellular radio network standard protocol routing scheme is defined by a UTRAN (Universal Terrestrial Radio Access Network) standard protocol, said data session is a PDP (Packet Data Protocol) context session complying with the 3GPP standard, said data session identifier is a 3GPP (3:rd Generation Partnership Project) TEID (Tunnel Endpoint Identifier) of a routing tunnel between said RNC and a gateway support node for said data session, and said first radio bearer identity is a Radio Access Bearer Identity (RAB ID) or a Radio Bearer Identity (RB ID) complying with the 3GPP standard.

In one embodiment, the method according to the invention further comprises the following steps:

receiving an inter-RNC handover request to switch said data session to a second target RNC, transferring at least said alternative routing identifier to said second RNC.

According to a seventh aspect, the invention provides a computer program comprising program code means which, when loaded into a processing means of a Radio Network Controller, RNC, make said processing means execute at least one procedure realising the method according to said sixth aspect.

According to an eighth aspect, the invention provides a computer readable medium having stored program code means which, when loaded into a processing means of a Radio Network Controller, RNC, make said processing means execute at least one procedure realising the method according to said sixth aspect.

Above steps/actions need not be executed in the order indicated above. Even though the invention has been summarised above, the invention is defined by the appended claims 1-40.

BRIEF DESCRIPTION OF THE DRAWINGS

The features and advantages of the present invention will be more apparent from the following detailed description of the preferred embodiments with reference to the accompanying drawings, wherein:

FIGS. 5A-C illustrates the method according to the invention according to one embodiment.

FIGS. 8A-B illustrates the method according to the invention according to an alternative embodiment.

DETAILED DESCRIPTION OF PREFERRED EMBODIMENTS

The present invention will here be described for the specific case that the cellular radio network is a UTRAN and that the alternative Wireless Data Network is a WLAN, i.e. in accordance with the IEEE 802.11 standard, but the invention is applicable for any cellular radio network integrated with any alternative wireless data network, e.g. any Layer 2 Radio Network (L2-RN) in accordance with the IEEE 802 standard protocol family, such as Wireless Personal Area Networks (WPAN, IEEE 802.15), Wireless Metropolitan Area Networks (WMAN, IEEE 802.16), Mobile Broadband Wireless Access (MBWA, IEEE 802.20), Wireless Regional Area Networks (WRAN, IEEE 802.22) etc. Furthermore, as an illustrative example, the UTRAN is connected to the Internet via an intermediate UMTS (Universal Mobile Terrestrial System) network.

Figure 1:
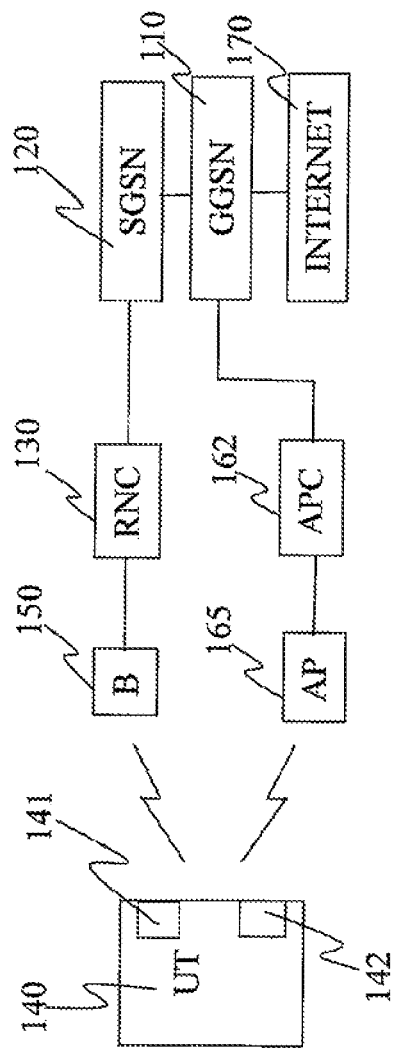
FIG. 1 illustrates a known integrated UTRAN-WLAN network architecture.
Figure 2:
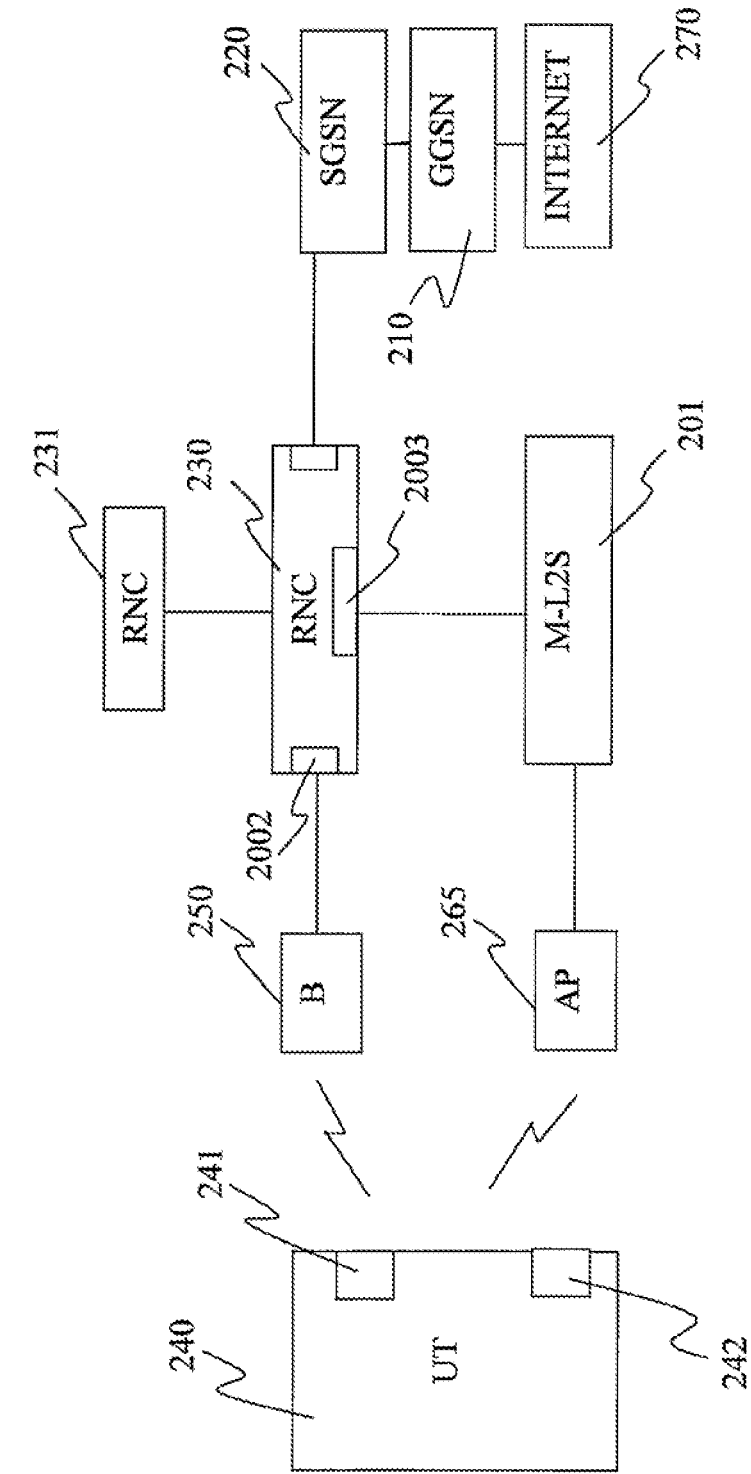
FIG. 2 illustrates an integrated UTRAN-WLAN network architecture according to one embodiment of the present invention.
Figure 4:
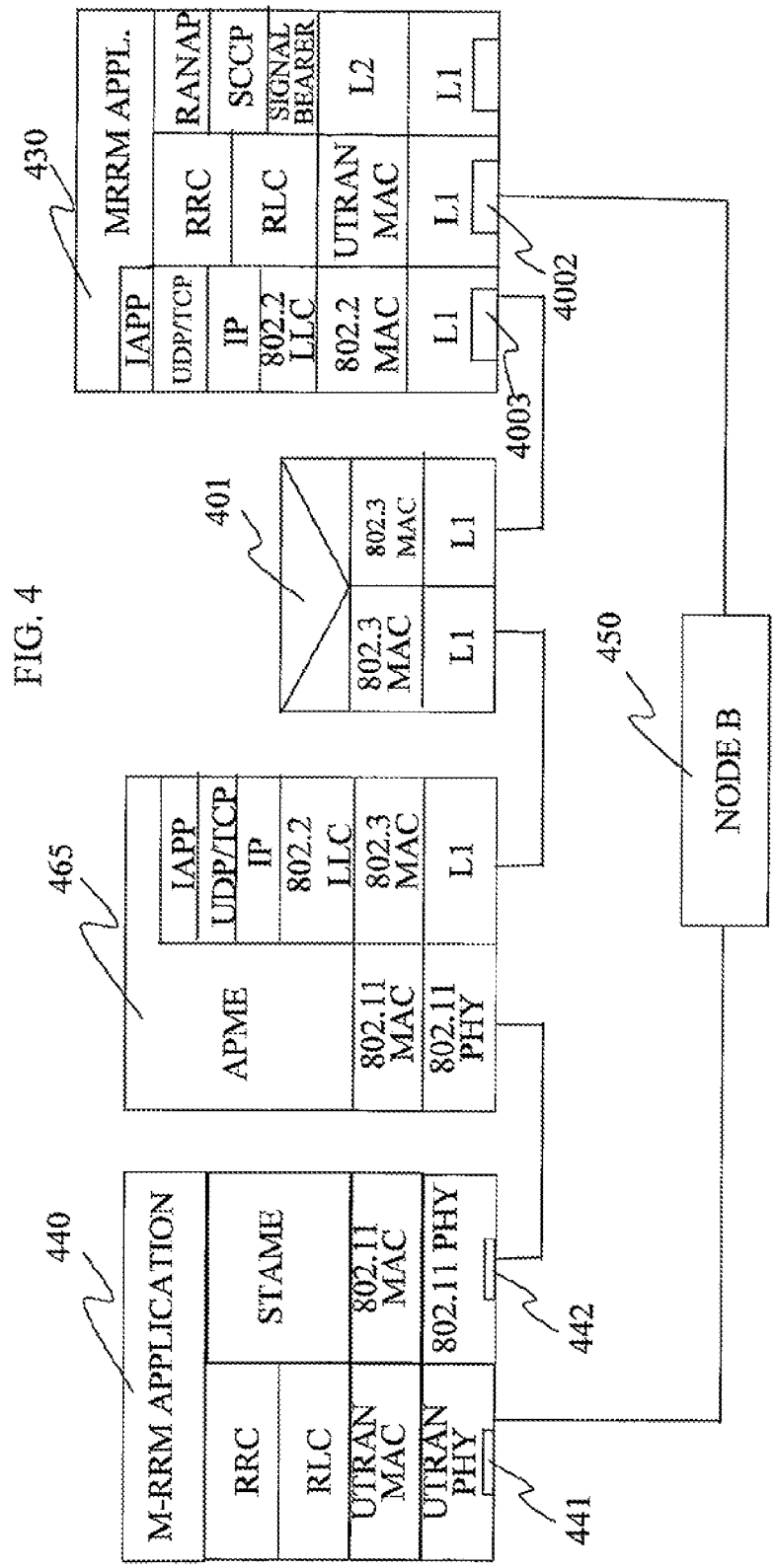
FIG. 4 illustrates an example of the protocol stacks and applications of the network illustrated in FIG. 2.
Figure 5C:
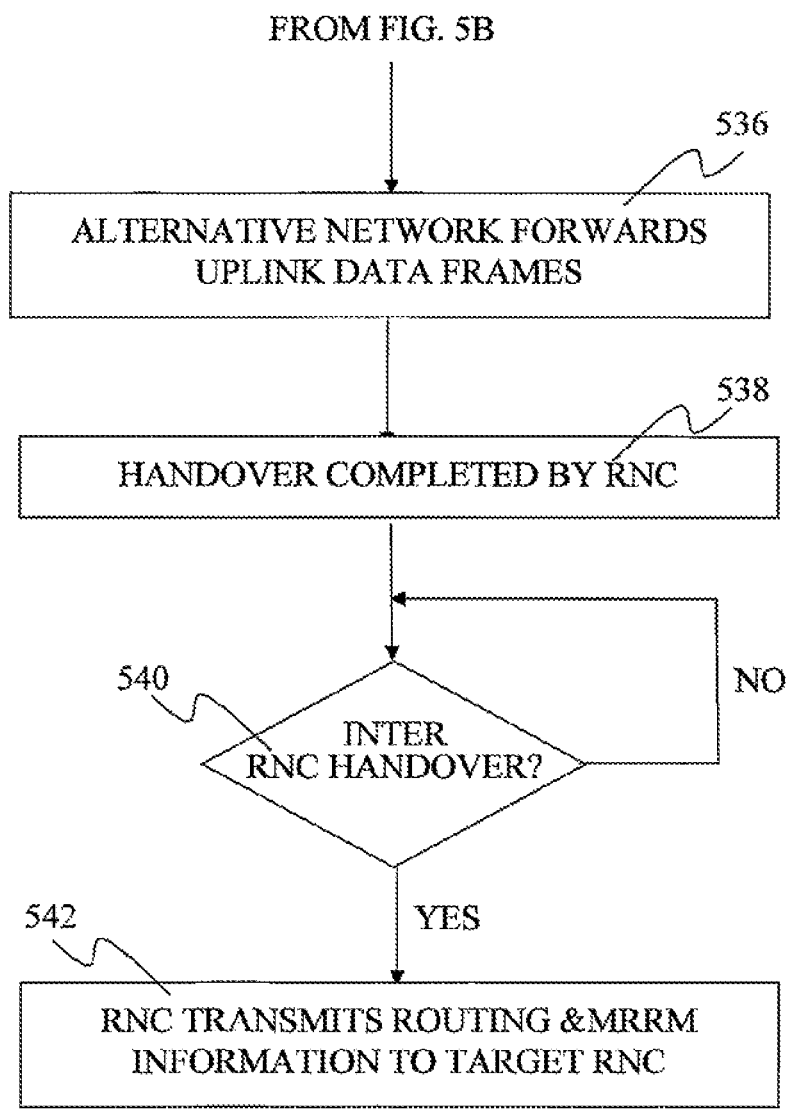
Figure 6:
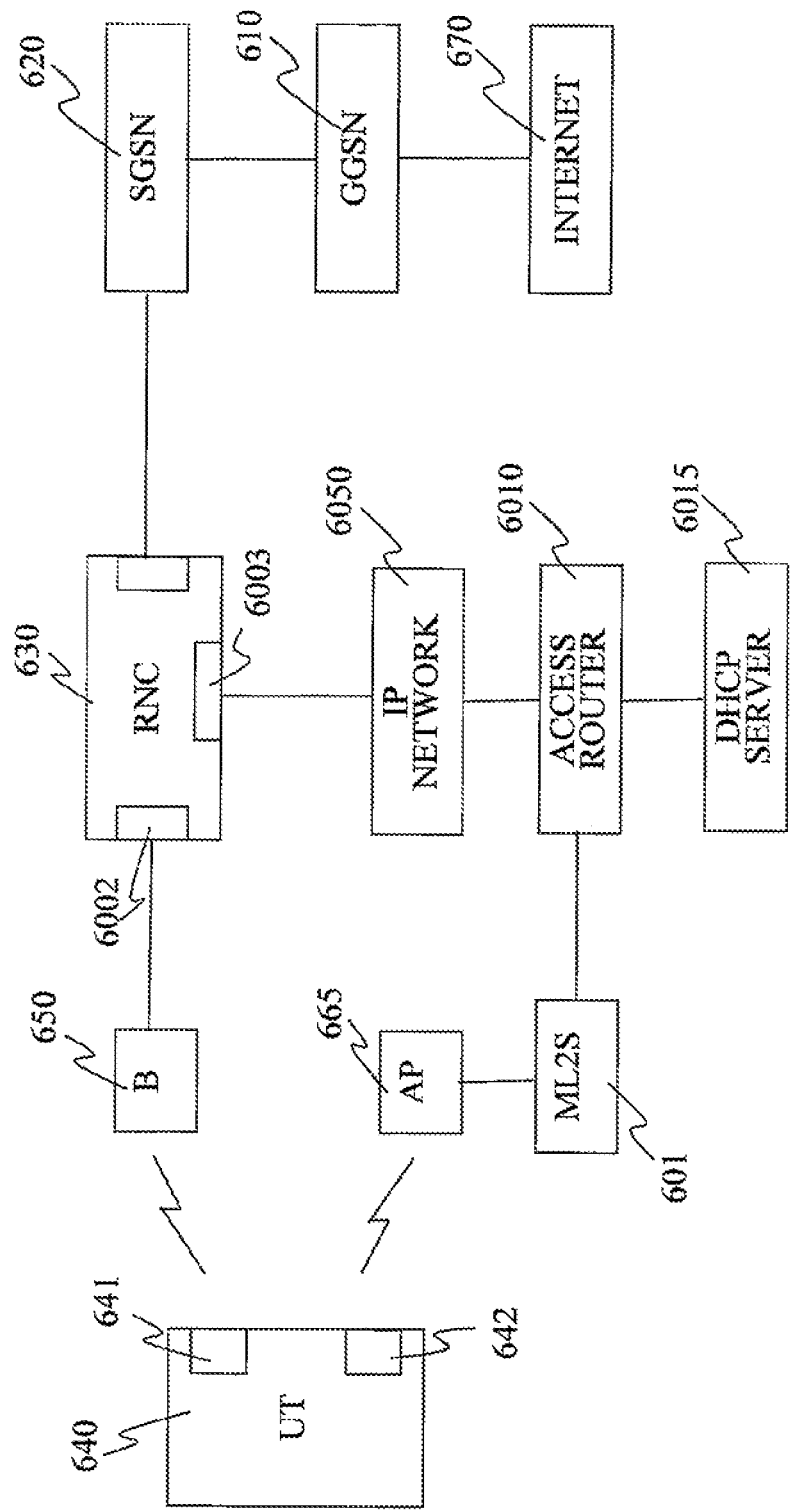
FIG. 6 illustrates an integrated UTRAN-WLAN-IP-Network architecture according to an alternative embodiment of the present invention.

Each element has been given the same reference number in FIGS. 1-8 along with a figure prefix number, e.g. the RNC 230 in FIG. 2 is referred to as RNC 630 in FIG. 6 etc.

FIG. 2 illustrates the architecture of an UTRAN-WLAN-integrated network 200 according to one embodiment of the present invention, connected to the Internet 270. Now, the WLAN's conventional layer 2 Ethernet switches are hereafter referred to as M-L2S:s (Multicast-enabled Layer 2 Switches). Since the Ethernet (IEEE 802.3) protocol is used for most of the WLAN's layer 2 protocol to communicate with fixed network infrastructure, an M-L2S is identical with an Ethernet switch. In FIG. 2, the RNC 230 is connected with the M-L2S 201, and the M-L2S 201 is connected to the Access Point, AP, 265, however, many possibilities exist. A plurality of AP:s may e.g. be connected directly to the RNC (230) or to a plurality of intermediate M-L2S:s connected to the RNC 230. There may be several M-L2S:s in the routing path between an AP and an M-L2S. Normally, in order to facilitate distributing or multicasting layer 2 messages within the WLAN, the RNC (230) is connected to the WLAN through one single M-L2S. The RNC 230 is normally connected to further RNC:s in a conventional manner, illustrated by RNC 231 in FIG. 2, which in turn may be connected to their respective WLAN, e.g. via M-L2S:s. The RNC 230 is connected to the SGSN 220 through the RNC data port 2001, and with the Node B 250 through the RNC data port 2002. The SGSN 220 is connected to the GGSN 210 which in turn is connected to the Internet 270. According to the invention, the RNC 230 is further connected with the M-L2S 201 through the RNC data port 2003. The AP 265 is connected with the M-L2S 201. The dual mode/capability UT 240 can establish a WLAN radio connection with the AP 265 of the layer 2 WLAN network through its data port 242. In a conventional manner, specific applications or protocols may share a common physical data port, defined by a MAC (Media Access Control) protocol layer. Normally however, the data ports 2001, 2002 and 2003 are associated with physically separated contacts, e.g. data port 2003 is associated e.g. with a separate Ethernet contact. The RNC 230, port 2002 of RNC 230, base station node B 250, port 241 of UT 240 and UT 240 define a first access network and a first routing path, i.e. a cellular radio network routing path realised in form of a UTRAN, of a data session, such as a PDP context session. The RNC 230, port 2003 of RNC 230, M-L2S 201, the AP 265, port 242 of UT 240 and UT 240 define an alternative access network and an alternative routing path, i.e. a wireless data network routing path realised in form of a WLAN, of a data session, such as a PDP context session.

The functionality, e.g. regarding routing, radio resource management etc., of e.g. the UT 240, the RNC 230, the M-L2S 201 and the AP 265 in FIG. 2 is normally realised by protocol stacks and software applications loaded in processing means, e.g. CPU:s at the UT 240, the RNC 230, the M-L2S 201 and the AP 265.

Referring back to FIG. 2, a data communication session between the UT 240 and a second party, e.g. a peer or a host on the Internet 270, is normally carried out by means of a PDP context session between the UT 240 and the GGSN 210. A PDP context session between the UT 240 and the GGSN 210 can be established in different conventional ways, e.g. on the initiative of the UT 240, by having the UT 240 sending a PDP context request along with one of its (unused) NSAPI (Network layer Service Access Point Identifier), which is a standard 3GPP identifier, transparently to the GGSN 210, i.e. the RNC 230 and SGSN 220 forwards the request to the GGSN 210. The GGSN 210 then initiates the PDP context session set up by performing various signalling with the SGSN 220 and the RNC 230 in a conventional manner, with the result that one GTP-U tunnel is set up between the GGSN 210 and the SGSN 220 and another GTP-U tunnel is set up between the SGSN 220 and the RNC 230. Each GTP-U tunnel is identified by its TEID (Tunnel Endpoint Identifier). The SGSN 220 then requests the RNC 230 to assign a unique 3GPP RAB ID (Radio Access Bearer Identity, according to the 3G standard), which is also stored in the SGSN 220. The RNC 230 thereafter also assigns a unique 3GPP RB ID (Radio Bearer Identity, according to the 3G standard), for the PDP context session in question. The PDP context session is characterised by the assigned IP address and QoS profile (and possibly also a specific Traffic Flow Template, TFT) and may be uniquely associated e.g. with the UT's NSAPI and/or the TEID of the GTP-U tunnel between the RNC 230 and the SGSN 220, in the RNC 230. What is important according to the invention is that the RNC 230 uses a session identifier which unambiguously and uniquely identifies the data session in question, i.e. the PDP context session in this case, for routing the session. Normally, the RNC 230 uses the TEID as a session identifier for routing purposes. The NSAPI is used on a temporary basis, i.e. it may be reused for other sessions. Thus, in a PDP context session, data packets are tunnelled by the GTP-U protocol between the GGSN 110 and the SGSN 120, and between the SGSN 120 and the RNC 130. The packets are decapsulated in the RNC 130 and further tunnelled to the UT 140 by using the 3G-PDCP protocol between the RNC 130 and the UT 140. More specifically, the RNC 230 routes the packets to the accurate UT by binding the TEID of the GTP-U tunnel between the RNC 230 and the SGSN 220 to said 3GPP RAB ID in a one-to-one relationship, and then binds the RAB 18 to the 3GPP RB ID in a one-to-one relationship, in a conventional manner. The 3GPP RAB ID is a conventional identifier defining the logical connection for the data session between the UT 240 and the SGSN 220 and the 3GPP RB ID is a conventional identifier uniquely defining the physical UTRAN communication connection between the RNC 230 and the UT 240. Thus, in the RNC 230, there is a one-to-one relationship between the TEID, the RAB ID and the RB ID for a specific PDP context session. The RNC 230 binds the session specific 3GPP TEID to the session specific 3GPP RAB ID and the 3GPP RAB ID to the session specific 3GPP RB ID in a one to one relationship in order to route the PDP context data (up-link and down link) between the UT 240 and the GGSN 210 correctly, in a conventional manner. An illustrative example of (part of) a conventional routing table for PDP context session routing, used by the RNC 230, is illustrated in Table 1. As illustrated in Table 1, one UT may have a plurality of ongoing PDP context sessions, each uniquely identified by a specific RB ID, a specific RAB ID and a specific TEID at the RNC (230).

TABLE 1

| PDP Session | 3GPP RB ID | 3GPP RAB ID | UT | TEID | GTP-U |
|---|---|---|---|---|---|
| Session 1 | RB ID 1 | RAB ID 1 | UT 1 | TEID 1 | GTP-U 1 |
| Session 2 | RB ID 2 | RAB ID 2 | UT 1 | TEID 2 | GTP-U 2 |
| Session N | RB ID N | RAB ID N | UT K | TEID N | GTP-U N |

In a similar manner, table 2 shows (part of) the identifiers involved for conventional PDP context session management at the UT 240. The 3GPP RAB ID and 3GPP RB ID at the UT 240 are identical with the 3GPP RAB ID and 3GPP RB ID at the RNC (230), and hence uniquely identify the data session in question, i.e. the PDP context session. The UT normally uses the 3GPP RAB ID as a unique session identifier and routes PDP context session data over the cellular radio network path, i.e. the UTRAN path in this case, by binding the 3GPP RAB ID to the 3GPP RB ID. Furthermore, each PDP context session has its own assigned NSAPI at the UT 240, in a conventional manner. The NSAPI:s are used by the UT 240 to identify to which session a specific PDP-IP-packet belong after decapsulation of the PDP-IP-packets in a conventional way. The 3GPP RAB ID and 3GPP RB ID are identical at the RNC 230 and UT 240, in a conventional manner.

TABLE 2

| PDP Session | 3GPP RB ID | 3GPP RAB ID | NSAPI | Application |
|---|---|---|---|---|
| Session 1 | RB ID 1 | RAB ID 1 | NSAPI 1 | Web browsing |
| Session 2 | RB ID 2 | RAB ID 2 | NSAPI 2 | E-mail |
| Session N | RB ID N | RAB ID N | NSAPI N | Multimedia download |

Figure 3:
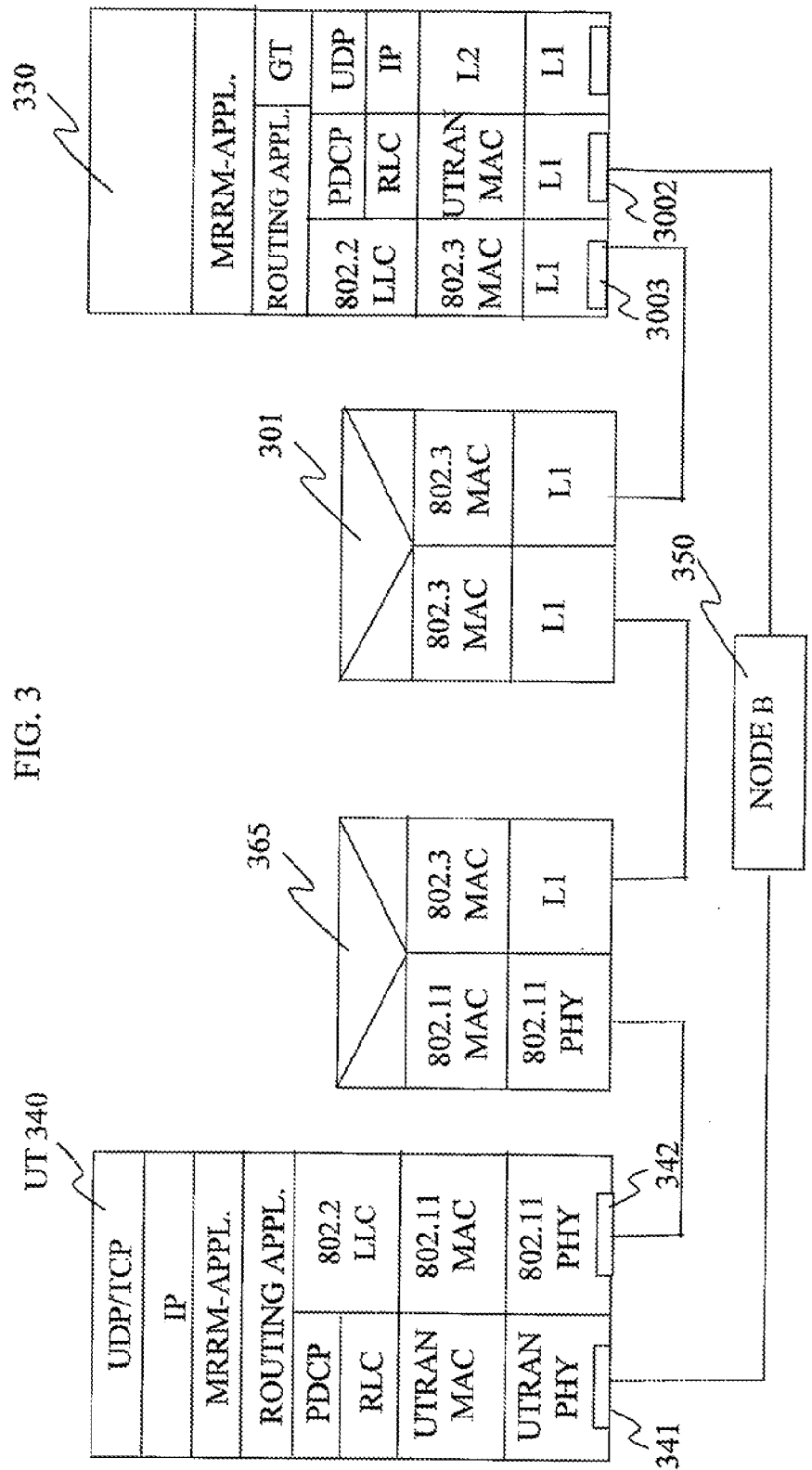
FIG. 3 illustrates an example of the protocol stacks and software applications of the network illustrated in FIG. 2

FIG. 3 illustrates an example of the protocol stacks and applications which according to the invention are used by the RNC 230, the M-L2S 201, the AP 265 and the UT 240 in FIG. 2. In FIG. 3, the RNC 330 has conventional UTRAN protocol stack installed, comprising UTRAN MAC (Media Access Control) protocol, defining data port 3002, RLC (Radio Link Control) protocol, PDCP (Packet Data Convergence Protocol), GTP-U (GPRS Tunnelling Protocol—User plane) protocol, UDP (User Datagram Protocol) and IP (Internet Protocol). According to the invention, the RNC 330 further has an Ethernet- and WLAN-protocol stack installed associated with data port 3003, i.e. the IEEE 802.3 MAC protocol, defining data port 3003, and the IEEE 802.2 LLC (Link Layer Control) Ethernet protocol stack. The conventional "WLAN-part", i.e. the M-L2S 301 and the AP 365 have conventional physical layers and IEEE 802.3 & 802.11 MAC protocol layers installed. The UT 340 has a conventional UTRAN protocol, comprising a UTRAN physical layer, MAC layer, defining data port 341, RLC layer and PDCP layer. The UT 340 has also an IP protocol, a UDP/TCP and higher application protocol layers installed. According to the invention, the UT 340 has also an Ethernet- and WLAN-protocol stack installed, i.e. an IEE 802.11 physical layer, MAC layer, defining data port 342, and 802.2 LLC layer. According to the invention, the UT 340 has a Routing application and a MRRM application installed "on top" of the LLC/PDCP/MAC layers. In a similar manner, the RNC 330 has a Routing application and a MRRM application installed "on top" of the LLC/PDCP/MAC layers. The Routing application, the MRRM application of the UT 240 and of the RNC 230, respectively, along with the lower layers, allow the UT 240 and RNC 230 to establish logical data connections between their respective Routing and MRRM applications by conventional layer data processing. For instance, the MAC layer filters out packets intended for the physical device, the LLC layer forwards the packets to the "right" layer/application which in turn may forward the packet further up to a specific layer/application until it is received by the "right" application. The MRRM and Routing applications are according to the invention further arranged to communicate with each other.

FIG. 4 illustrates an example of the control plane protocol stacks used by the RNC 230, the M-L2S 201, the AP 265 and the UT 240 in FIG. 2. In FIG. 4, the RNC 430 has conventional UTRAN protocol stack installed, comprising a UTRAN MAC layer, defining port 4002, an RLC protocol, a signalling bearer towards the core network, a SCCP (Signalling Connection Control Part) and RANAP (Radio Access Network Application Part). According to the invention, the RNC 430 further has an Ethernet- and WLAN-protocol stack installed associated with data port 4003, i.e. the IEEE 802.3 MAC protocol, defining data port 4003, and the IEEE 802.2 LLC Ethernet protocol stack. Furthermore, according to the invention, the RNC 430 has an IP layer, a UDP/TCP layer and a conventional IAPP (Inter Access Point Protocol) installed on top of the 802.2 layer. The conventional "WLAN-part", i.e. the M-L2S 401 and the AP 465 have conventional physical layers and IEEE 802.3 and 802.11 MAC protocol layers installed. AP 465 has further an IP layer, a UDP/TCP layer and an IAPP layer installed on top of the 802.2 layer, and furthermore an APME (Access Point Management Entity) application. The UT 440 has a conventional UTRAN protocol, comprising a UTRAN physical layer, MAC layer, defining data port 442, and RLC layer. The UT 440 has also an IP protocol, a UDP/TCP and higher application protocol layers installed. According to the invention, the UT 440 has also an Ethernet- and WLAN-protocol stack installed, i.e. an IEEE 802.11 physical layer, MAC layer and 802.2 LLC layer. Furthermore, UT 440 has a STAME (Station Management Entity) application installed on top of said 802.11 MAC layer. The UT 340 has a MRRM application installed "on top" of the LLC/MAC layers. In a similar manner, the RNC 330 has a Routing application and a MRRM application installed "on top" of the LLC/MAC layers. The STAME application of UT 240 along with the APME application of AP 265 and IAPP of AP 265 and RNC 230 makes it possible for the MRRM applications of UT 240 and RNC 230 to communicate RRM information, and makes it possible for the AP 465 to communicate RRM information with UT 440 and RNC 430, as a person skilled in the art realises. The UT 440 has a RRC (Radio Resource Control) entity which can communicate with the MRRM application of UT 440 and the RNC 430 has a RRC (Radio Resource Control) entity which can communicate with the MRRM application of RNC 430, as illustrated in FIG. 4. The MRRM applications of UT 440 and RNC 430 can exploit their respective RRC entities for signalling between the UT 440 and the RNC 430. The MRRM applications of UT 440 and RNC 430 may exploit the STAME-application and the APME application along with the IAPP protocol to signal RRM (Radio Resource Management) information, as illustrated in FIG. 4, but any protocol for exchanging RRM information between a network (access) node and a network control node may be used instead, as a person skilled in the art realises, e.g. a LWAPP, (Light Weight Access Point Protocol), not illustrated in FIG. 4, could be used instead of the IAPP.

FIG. 5 illustrates a method for performing a handover of a PDP context data session from the UTRAN radio network routing path (via port 241) to the alternative WLAN radio network routing path (via port 242) in FIG. 2, according to one embodiment of the present invention, in accordance with the network architecture depicted in FIG. 2. The method according to this embodiment of the invention shall now be described in more detail with reference to FIGS. 2, 3, 4 and 5.

Referring to FIG. 5, in step 500, the UT 240 has an established conventional communication connection with the RNC 230 over the UTRAN path and the UT MRRM application decides in step 500 to send a capability message or not according to specific application settings. In one embodiment, the UT MRRM application program of UT 240 decides to form and transmit a capability message to the MRRM application of RNC 230 via the UTRAN communication path in step 500. The method according to the invention then proceeds to step 501. In an alternative embodiment, the UT MRRM application of UT 240 decides not to send any capability message at this stage, and the method proceeds to step 510.

In step 501, the MRRM application of UT 240 forms and sends a capability message to the MRRM application of RNC 230. According to the invention, this capability message uniquely identifies said UT 240 according to a standard protocol routing scheme of said first access network, e.g. the cellular radio network in form of the UTRAN, and also uniquely identifies said UT 240 according to a standard protocol routing scheme of said alternative access network, e.g. the protocol routing scheme of the WLAN. This message is thus formed, and sent, in such a way by the MRRM of UT 240 that the MRRM application of RNC 230 can extract information uniquely identifying the UT 240 according to both of said standard protocol schemes, and set up a radio bearer identity defining a data session connection with said UT 240 for both of said networks, at a later stage. The capability message may for instance be sent over the UTRAN path via an already established connection, e.g. over the DCCH, thereby uniquely identifying the UT 240 to the RNC according to the UTRAN routing scheme protocol standard, and comprise the alternative network address, NA, i.e. the WLAN MAC address of the UT 240 in this case, associated with the UT's 240 alternative WLAN routing path and data port 242. The RNC is thus informed that the UT 240 has WLAN-capability and can establish a radio communication connection with the AP 265, and the RNC 230 may also define a data communication session with UT 240 through the WLAN by setting up a WLAN radio bearer identity with specific QoS requirements and associate the WLAN radio bearer identity with the WLAN MAC address of UT 240. Thus, the NA is defined according to a standard protocol routing scheme of said WLAN network, differing from the routing scheme of the cellular radio network, i.e. the 3GPP routing scheme. Many possibilities exist, This message can e.g. be a modified RRC (Radio Resource Control) message sent from UT 240 to RNC 230 on the up-link DCCH, over the UTRAN communication path, but may be sent over the WLAN to the RNC 230 and comprise e.g. the UT's 240 3GPP IMSI (International Mobile Subscriber Identity), or the IP-address of the PDP context session, in case there is only an established connection over the WLAN communication path, as a person skilled in the art realises.

In step 505, the MRRM application of RNC 230 receives the capability message sent over the UTRAN path and identifies that said UT 240 has dual mode capability, i.e. is capable of communicating via both said first and alternative routing path. Normally, in case the first access network is a cellular radio network and said alternative access network is a WLAN, the MRRM application of RNC 230 carry but this by extracting the NA from the received capability message, i.e. the WLAN address of UT 240, and updates the relevant MRRM and Routing information accordingly, i.e. by associating said NA with the specific UT 240 in the Routing Table 1 of the Routing application, but other possibilities exist. The identity of UT 240 is known to RNC 230 since the capability message was sent over the UTRAN path. The RNC 230 may for instance use a 3GPP radio bearer identity exploited for the capability message transmission over the UTRAN path in step 501, e.g. a 3GPP RB ID, to identify the UT 240.

In step 510, a PDP context session is set up between the UT 240 and the GGSN 210 enabling a data communication session between the UT 240 and e.g. an Internet host or a peer connected to the Internet. The PDP context session is set up in a conventional manner, e.g. as described above. Normally, the RNC 230 signals its MAC address to the UT 240 in step 510, e.g. by means of an RRC message over the UTRAN path, but many possibilities exist.

In step 511, data of said PDP context session are routed over the first routing path, i.e. the UTRAN routing path, in a conventional manner by letting the Routing application of UT 240 bind a session identifier uniquely identifying said PDP context session, e.g. the 3GPP RAB ID, to a first routing identifier, e.g. the 3GPP RB ID and the Routing application of RNC 230 binds a first session identifier uniquely identifying said PDP context session, e.g. the TEID of the relevant GTP-U tunnel, to a first routing identifier, e.g. the 3GPP RB ID associated with said UT 240. Thus, the session identifiers and first routing identifiers are defined according a standard protocol routing scheme of the first access network, i.e. a cellular radio network, i.e. the 3GPP UTRAN in this case.

In step 515, the MRRM application of UT 240 establishes whether a capability message is to be sent or not. In one embodiment, if the MRRM application of UT 240 decided not to send any capability message in step 500, then the UT MRRM application decides to send a capability message in step 515, and the method proceeds to step 517. In another embodiment, no capability message is sent and the method proceeds to step 520.

In step 517, the MRRM application of UT 240 forms and sends a capability message to the MRRM of RNC 230 in the same manner as described in step 501 above, according to one embodiment. In one embodiment, the capability message further comprises a session identifier uniquely identifying the data session, e.g. the 3GPP RB ID or the 3GPP RAB ID of Table 2, uniquely identifying the specific PDP data context session established in step 510. In this way, the UT 240 can control which PDP context session/s, among a set of ongoing PDP context session/s, for which a handover may be desirable. This may be accomplished by letting the UT 240 send said capability message over the UTRAN path e.g. exploiting said 3GPP RB ID 1 and 3GPP RAB ID 1, so that the RNC 230 can extract said 3GPP RB ID and 3GPP RAB ID, which uniquely identify the specific PDP context session.

In step 519, the MRRM application of RNC 230 receives said capability message, extracts said NA and associates the NA, i.e. the WLAN address of UT 240 with the specific UT 240, in the same manner as in step 505. In an alternative embodiment, in case the capability message also comprises a specific PDP context session identifier, e.g. the above 3GPP RB ID 1, the RNC 230 only associates said NA with the specific PDP context session of UT 240, i.e. with the RNC's specific session identifier TEID 1.

In step 520, the Routing application of UT 240 detects the WLAN (broadcast) beacon signal from AP 265, which signal comprises the AP:s 265 MAC address, and the UT 240 reads this AP MAC address and associates it with its port 242, if the UT 240 does not know the RNC's 230 MAC address at this stage. Normally, the UT 230 knows the RNC's 230 MAC address at this stage, e.g. it was signalled in step 510 above, and associates port 242 with the RNC's 230 MAC address in step 520. The MRRM application of UT 240 further creates an alternative routing identifier for the relevant data session/s, in this case referred to as a WLAN Radio Bearer Identity, WLAN RB ID 1, and associates the relevant PDP context session with it, e.g. by updating its routing table as illustrated in Table 3. The UT 240 associates the relevant PDP context session with WLAN RB ID 1 and the WLAN RB ID 1 with data port 242. Alternatively, the alternative routing identifier may be created by the RNC 230 and signalled to the UT 240 over the UTRAN path.

TABLE 3

| PDP Session | 3 GPP RB ID | 3 GPP RAB ID | NSAPI | WLAN Radio Bearer ID | Application |
|---|---|---|---|---|---|
| Session 1 | RB ID 1 | RAB ID 1 | NSAPI 1 | WLAN RB ID 1 | Web browsing |
| Session 2 | RB ID 2 | RAB ID 2 | NSAPI 2 | | E-mail |
| Session N | RB ID N | RAB ID N | NSAPI N | | Multimedia download |

Thereafter, in step 522, the UT 240 sends an association request message, in accordance with the IEEE 802 standard, to the AP 265, in order to initiate the WLAN connection set-up. This message comprises the UT's 240 MAC address. The AP 265 updates its bridging table accordingly by associating its relevant port with the UT's 240 WLAN MAC address. In one embodiment, said association request message also comprises the PDP context session identifier, e.g. the RB ID or RAB ID or the IP-address of the PDP context session or the NSAPI, for the relevant PDP session. The AP 265 responds by sending an Association Response message, as an 802.11 message, to the UT 240. The UT 240 receives this Association Response message and has thus an established radio connection with the WLAN via said second port (242).

In step 523, the AP 265 continues according to the IEEE 802 standard by broadcasting a layer 2 update frame towards the WLAN Distribution System (DS), i.e. to the M-L2S 201 towards the RNC 230. In one embodiment, said update frame also comprises said PDP context session identifier, sent to AP 265 in step 522.

The M-L2S responds in step 524 by forwarding this layer 2 update frame to the RNC 230. This layer 2 update frame comprises the WLAN MAC address of the UT 240 as MAC source address and is preferably multicasted. The purpose of this layer 2 frame is to cause the forwarding or bridging tables in any layer 2 devices that receive the frame to be updated accordingly with the UT's 240 MAC address, i.e. to associate the port that received this frame with the UT's 240 MAC address, so that all future traffic destined to the UT 240 is forwarded to the correct port, i.e. on the port which received this frame. Assuming the use of multicast-enabled switches (M-L2Ss), in order to avoid flooding of layer 2 frames and thus too high traffic in operator's network, the layer 2 update frames is preferably multicast to a group, to which neighbouring AP:s, serving the RNC 230 and the corresponding M-L2S 201 belong. In this case, each AP thus knows the Layer 2 network topology to a certain extent, e.g. by having a stored table of MAC-addresses of its neighbouring AP:s and associated M-L2S:s. In one embodiment, the layer 2 update frame also comprises said PDP context session identifier, e.g. the RB ID or RAB ID or the IP-address of the PDP context session or the NSAPI, for the relevant session, sent by UT 240 to AP 265 in step 522.

In step 525A, the AP decides whether to send an IAPP-ADD.Notify packet or not, depending on how it is pre-configured. As a person skilled in the art realises, instead of an IAAP-ADD.Notify packet, a corresponding message according to another protocol could be used, e.g. a message complying with the LWAPP, as mentioned above. In one embodiment, the method proceeds to step 525 B and the AP 265 multicasts an IAPP-ADD. Notify packet as UDP/IP packet, in accordance with the IAPP protocol and IEEE 802 standard mobility functionality, to notify other AP:s about the new association of the particular UT at the (new) AP. The IAPP packet includes the UT's 240 WLAN MAC address and a sequence number, which indicates the packet's validity, in a conventional manner. The multicast IP address should preferably be selected so that only the RNC 230 and other AP:s, which are geographically close to the sending AP 265 receive the IAPP packet. This in order to reduce the signalling within the WLAN domain. The intermediate M-L2S 201 is therefore preferably pre-configured accordingly, i.e. it has a stored list of IP-addresses for multicasting the IAPP-ADD.Notify packet. Step 525B has the main purpose to inform the AP:s in the Layer 2 Network which AP actually is selected to communicate with the UT 240, so that a radio communication is handed over correctly from one AP to another. Step 525B constitutes part of conventional RRM (Radio Resource Management) of L2-RN:s. In one embodiment, the IAPP-ADD-.Notify packet also comprises conventional WLAN Radio Resource Management parameters such as e.g. current cell load, signal strength etc for the established WLAN radio channel between UT 240 and AP 265. This may be carried out by adding said WLAN RRM parameters in a specific context container in the IAPP-ADD.Notify packet, as a person skilled in the art realises. In one embodiment, said IAPP-ADD.Notify packet also comprises said PDP context session identifier, e.g. the RB ID or RAB ID for the relevant session, sent from UT 240 to AP 265 in step 522. In an alternative embodiment, the method proceeds directly to step 526 from 525A and no IAPP-ADD.NOTIFY Packet is sent.

In step 526, according to one embodiment, in case UT 240 decided not to send a capability message neither in step 500 nor in step 515, the MRRM application of UT 240 forms and transmits a capability message as described in step 517 above, and the RNC MRRM application receives said message and extracts the relevant parameters and makes the appropriate associations, as described above with reference to step 519. In an alternative embodiment, in case no capability message has been sent at this point, the radio link message sent from UT 240 to AP 265 in step 522 may also comprise a PDP context session identifier, e.g. the 3GPP RB ID 1 or 3GPP RAB ID 1 for the relevant session, and this session identifier is forwarded to the RNC 230 e.g. with the layer 2 update frame to the RNC 230, or with said IAPP-ADD.Notify packet, as described in above steps 522, 523, 524 and 525, and hence the RNC MRRM application of RNC 230 may interpret the received layer 2 update frame described in step 524 or the IAPP-ADD.Notify packet described in step 525 as a capability message. In still another embodiment, the UT MRRM application of UT 240 forms a capability message comprising the UT's NA, i.e. the UT's 240 WLAN address in this case, the PDP context session identifier for the specific PDP context session established in step 520, i.e. the 3GPP RAB ID 1 or 3GPP RB ID 1 or the IP-address of the PDP context session or NSAPI, in this case, and transmits this capability message to the RNC 230 via the UTRAN path, e.g. by using the DCCH, or via the WLAN path by transforming said capability message into LLC 802.2 frame format and multicasting said LLC 802.2 frame to the AP 265. Alternatively, said capability message (LLC frame) is sent to the RNC 230 as a dedicated message in case the RNC's MAC address is known to the UT 240. The MRRM application of RNC 230 then receives this capability message and associates the NA, i.e. the WLAN address of UT 240 with the specific UT 240, with the specific PDP context session identifier, i.e. the 3GPP TEID 1, in the same manner as in step 519 above.

Furthermore, in step 526, the RNC 230 creates an alternative routing identifier, in the same manner as UT 240 in step 520, in form of a specific WLAN radio bearer identity for the specific PDP context session, here referred to as a WLAN RB ID 1 as illustrated in Table 4 below, and associates this WLAN RB ID 1 with the NA, i.e. the WLAN MAC address, of the UT 240 (received on port 2003), and also associates the WLAN RB ID 1 with port 2003. The WLAN RB ID 1 of RNC 230 and UT 240 are identical since they are defined by the same standard routing protocol scheme. The Routing application of RNC 230 associates the relevant PDP context session (i.e. session 1) with said NA (UT's 240 WLAN MAC address), said alternative routing identifier, i.e. WLAN RB ID 1, and port 2003, e.g. by updating its routing table as illustrated in Table 4. Thus, the alternative routing identifier is defined according to a standard protocol routing scheme of said alternative access network, i.e. the WLAN in this case. Alternatively, the alternative routing identifier is signalled to the RNC 230 from the UT 240. Since the alternative routing identifier is created according to the same criteria, e.g. regarding routing scheme, the alternative routing identifier is identical at RNC 230 and UT 240.

identifier", and sends this association message to the RNC 230 over the UTRAN path, e.g. exploiting the DCCH, or, over the WLAN as a multicast frame message, or, in case the RNC's MAC address is known to the UT 240, e.g. it has been signalled over the UTRAN path from the RNC 230 at an earlier stage, the association message may be sent over the WLAN as a dedicated message having the RNC's MAC address as destination address. In case the association message is sent over the WLAN path, normally the association message does not comprise said "radio establishment identifier". Many possibilities exist how to form and combine the capability message and the association message. For instance, in case the association message also comprises the specific session identifier, the association message may also function as a capability message, and the method according to the invention does not require that the UT 240 send any specific capability message to the RNC 230. Thus, the terms "capability message" and "association message" are to some extent interchangeable according to the invention. Furthermore, an association message can be sent by the UT over the UTRAN path e.g. immediately after receiving the Association Response message from the AP 265 in step 522, but many possibilities exist. As stated above, the association message normally comprises information which uniquely identifies the specific PDP context session. In this way, the UT 240 can control which PDP context session/s, among a set of ongoing PDP context session/s, for which a handover may be desirable.

TABLE 4

| PDP Session | 3GPP RB ID | 3GPP RAB ID | UT | TEID | WLAN RB ID | NA | Data Port | GTP-U |
|---|---|---|---|---|---|---|---|---|
| Session 1 | RB ID 1 | RAB ID 1 | UT 1 | TEID 1 | WLAN RB ID 1 | UT's WLAN MAC address | 2003 | GTP-U 1 |
| Session 2 | RB ID 2 | RAB ID 2 | UT 1 | TEID 2 | | | | GTP-U 2 |
| Session N | RB ID N | RAB ID N | UT K | TEID N | | | | GTP-U N |

The RNC 230 continues to route user data of the PDP context session through the UTRAN radio interface, i.e. via port 2002, by continuing to bind the TEID of the PDP context session to the UTRAN (3GPP) RAB ID and the (3GPP) RAB ID to the (3GPP) RB ID. The method then proceeds to step 527, i.e. the TEID binds to the 3GPP RB ID.

In step 527, the UT MRRM application of UT 240 decides whether to send an association message to the RNC 230 or not, depending on its pre-configuration. The association message informs the RNC 230 that the UT 240 has established a radio connection with the WLAN and that a handover of the PDP context session from the UTRAN path to the WLAN path is possible. In one embodiment, e.g. in case a capability message was sent over the WLAN path in step 526, this capability message may also function as an association message and no association message is sent and the method proceeds to step 530. In another embodiment, the UT MRRM application of UT 240 decides to send an association message and the method proceeds to step 528.

In step 528, the UT MRRM application of UT 240 forms an association message comprising the UT's 240 NA, i.e. the WLAN address in this case, and preferably also a session identifier for the specific PDP context session, i.e. the 3GPP RAB ID 1 or RB ID 1 in this case, normally also along with some information stating that the UT 240 has established a radio connection with the WLAN, e.g. a "radio establishment In step 529, the RNC 230 receives said association message, extracts the NA of UT 240, and possibly also the "radio establishment identifier" in case the association message comprises such an identifier, and updates its routing table (Table 4 above) accordingly by setting the alternative routing identifier, i.e. the WLAN RB ID 1 in this case, to become an actual active binding candidate for the session identifier, i.e. TEID 1, to bind to. This means that the RNC 230 from this point may route the PDP context session through the UTRAN radio interface, i.e. via port 2002, by binding the session identifier, i.e. the TEID, of the PDP context session to the first routing identifier, i.e. the (3GPP) RB ID in this case, or route the PDP context session through the WLAN radio interface, i.e. via port 2003, by binding the session identifier, i.e. the TEID in this case, of the PDP context session to the alternative routing identifier, i.e. the WLAN RB ID 1 in this case. In case the association message uniquely identifies a specific session, among a set of active PDP sessions for the UT 240, the RNC 230 updates only the specific alternative routing identifier, i.e. the WLAN RB ID 1 in this case, to become an actual active binding candidate for the session identifier to bind to. In case the association message does not identify a specific session, i.e. it comprises only the NA of UT 240 along with some information stating that the UT 240 has established a radio connection with the WLAN, then the RNC 230 normally updates all alternative routing identifiers, i.e. the WLAN RB ID 1 for session 1, WLAN RB ID 2 for session 2 and so on, for all PDP sessions, to become actual active binding candidates for all the session identifiers, i.e. TEID 1, TEID2 and so on, to bind to. In one embodiment, e.g. in case the RNC 230 has received a capability message uniquely identifying the specific PDP context session, the "radio establishment identifier" may be omitted in the association message and the RNC 230 automatically interprets the association message accurately, since it is the second time the RNC 230 receives the NA of UT 240. The method then proceeds to step 530.

In step 530, a decision is taken to switch the routing of said PDP context session from said cellular radio network path (UTRAN path), via node B 250 and ports 2002 and 241, to said alternative data network path (WLAN path), via ports 2003 and 242. According to the invention, this decision may be taken by the UT 240 or the RNC 230 based on various RRM information. In one embodiment, the MRRM application of RNC 230 receives a RRM (radio resource management) message, comprising information regarding e.g. cell load, radio channel quality, BER, FER, from the WLAN's AP 265 by using the conventional WLAN radio resource management protocol, i.e. the IAPP protocol, as illustrated in FIG. 4. The AP 265 collects this RRM information by means of an installed conventional APME application and a cooperating conventional STAME application installed at UT 240, as illustrated in FIG. 4. The 802.11k signalling standard may be used in order to report the AP's 265 radio/cell-RRM information, e.g. channel load, traffic load, transmission success statistics, WLAN channel quality etc., for an 802.11 WLAN to the RNC 230. As discussed above with reference to step 525, the IAPP-ADD.Notify packet may comprise Radio Resource Management parameters such as cell load, signal strength, available data rates etc of the WLAN connection. In an alternative embodiment, the UT-MRRM application of UT 240 performs measurements regarding the radio link quality for both the UTRAN link and the WLAN link, and transmits a measurement report to the RNC MRRM application of 230, e.g. on the uplink DCCH, e.g. by exploiting the conventional UTRAN RLC protocol, or over the WLAN path by exploiting the LLC/WLAN-MAC protocol if the RNC's MAC-address is known to the UT 240, i.e. it has been signalled earlier. The measurement report may comprise parameter values regarding the signal strength, QoS, BER, FER, interference level, velocity of UT 240 etc for the UTRAN radio link/s and or WLAN radio link/s. The RNC-MRRM application of RNC 230 may take the decision in step 530 to perform a handover from the UTRAN routing path to the WLAN routing path e.g. if the WLAN currently offers a better/higher QoS level than the UTRAN or if the traffic load level of the UTRAN network exceeds a specific threshold value, or may decide to maintain the UTRAN routing path e.g. because the velocity of the UT 240 is too high, but many possibilities exist. In an alternative embodiment, the UT MRRM application of UT 240 takes the decision to switch the routing of the PDP context session to the WLAN routing path, e.g. based on said measured MRRM parameter values and/or radio resource management information received from AP 265, signalled using the cooperating STAME-APME applications, illustrated in FIG. 4. The UT 240 then signals this decision to the MRRM application of RNC 230. In one alternative embodiment, the WLAN routing path of the PDP context session is always preferred because of metering parameters, i.e. cost/minute or transferred Kbit. What is important is that the invention provides a possibility to provide MRRM functionality in the RNC 230 and/or the UT 240 enabling e.g. handover decisions taking into account the exploitation of the radio resources of both said UTRAN and WLAN. In this way, the invention provides a possibility to develop completely new and more efficient MRRM functionality which takes into account both the UTRAN and other integrated L2-RN, since the RNC 230 and/or UT 240 has access to both UTRAN and WLAN RRM information. Alternatively, the invention provides a possibility to provide a MRRM functionality at the AP 265. In a preferred embodiment, the MRRM of RNC 230 takes the handover decisions. It should be noted that the invention gives a possible advantage of collecting all the MRRM information in the "right" node, i.e. in the radio network control node, RNC 230, in which the conventional UTRAN RRM-functions are realised.

According to the method of the invention, the method remains in step 530 until a decision has been taken to handover the PDP context session to the WLAN routing path, and then proceeds to step 531.

In step 531, in one embodiment, the RNC 230 executes the handover of the PDP context session from said cellular radio network path to said WLAN routing path, i.e. switches user plane transmission from the UTRAN path to the WLAN path. The handover is executed by the Routing application of RNC 230 which binds the PDP context session identifier, normally the TEID, to the alternative radio bearer identity, i.e. the WLAN RB ID 1 in this case, instead of to the conventional 3GPP RB ID, in table 4, thereby starting to route downlink IP packets of the PDP session through the WLAN routing path via port 2003, instead of through the UTRAN path via port 2002. The transmission switch is crucial for the downlink IP packets received by RNC 230 from SGSN 220 through the corresponding GTP-U tunnel. In conventional user plane transmission the RNC decapsulates the IP packets from the GTP-U PDU and encapsulates them with PDCP prior to transmission over UTRAN channels. The invention allows seamless transmission switching without data loss by having the Routing application entity of RNC 230 carrying out the following steps:

1. All downlink IP packets that have already been encapsulated and cached as PDCP packets before the inter-RAT (Radio Access Technology) handover is decided, are transmitted to the UT 240 using the UTRAN path. Such IP packets may be cached at RNC 230 because they are waiting for their transmission or they have been transmitted to UT 240 but have not yet been confirmed. As long as RNC receives uplink IP packets from UT 240 through its UTRAN routing path, the RNC's 230 RLC entity acknowledges the packet reception using the UTRAN path (in case that RLC acknowledged mode is used), according to the invention.

2. In case that an acknowledged mode RLC service is configured in the PDP context for user plane transmission, an LLC connection set-up is normally first carried out between the LLC entities at the RNC 230 and the UT 240 to allow acknowledged transmissions of LLC type 2 frames. This is normally done by letting the RNC 230 send a LLC set up connection message frame to UT 240, before the first (downlink) PDP-IP packets are transmitted as Ethernet 802.3 frames, using the LLC type 2 connection service (acknowledged mode).

3. All downlink IP packets de-capsulated from the GTP-U PDUs after the inter-RAT handover is decided in step 530, are encapsulated as LLC/Ethernet frames with the UT's 240 WLAN MAC address as destination address and RNC's 230 MAC address as source address. These frames are then sent through the RNC's 230 (Ethernet) port 2003 towards the UT through one or several M-L2Ss and the WLAN AP 265.

The downlink LLC/Ethernet frames created in the RNC 230 in step 531 are then transmitted on RNC's 230 port 2003 to the M-L2S 201. These are LLC/Ethernet 802.3 frames comprising the downlink PDP IP packets. Since the M-L2S 201 has updated its bridging tables in steps 503, these downlink Ethernet frames are routed accurately through the WLAN towards UT 240 in step 531. In one embodiment, the RNC Routing application entity adds a session identifier for the specific session, e.g. the WLAN RB ID 1 or 3GPP RB ID 1 in this case, in the RNC-MRRM application header before encapsulating the downlink packets as LLC/Ethernet frames. This provides a possibility for the UT-Routing application of UT 240 to uniquely identify the specific PDP session to which downlink PDP IP packet relates, when received via the WLAN routing path via port 242.

In step 532, the M-L2S 201 forwards the received downlink LLC/Ethernet 802.3 frames to the AP 265. The AP 265 transforms the downlink IEEE 802.3 frames to conventional IEEE 802.11 frames and transmits these to the UT 240.

In step 534, according to one embodiment, the UT 240 switches the routing path of said PDP context session from the UTRAN routing path to the alternative WLAN routing path after receiving the alternative network source address of RNC 230, NSA, i.e. the MAC address of RNC 230 in this case. For instance, the UT 240 may extract said NSA from said LLC set up connection frame according to one embodiment, or when it receives the first PDP context downlink IP packets from RNC 230, having the destination IP address of the UT 240 embedded in a LLC/MAC frame comprising the RNC's 230 MAC address as source address, according to another embodiment. Alternatively, the RNC's 230 MAC address was signalled to the UT 240 in step 510. The Routing application of UT 240 then updates its routing table by associating the session identifier/s with the RNC's NSA, i.e. the MAC address of RNC 230 in this case, as illustrated in table 5 below.

TABLE 5

| PDP Session | 3GPP RB ID | 3GPP RAB ID | NSAPI | NSA of RNC | WLAN Radio Bearer ID | Application |
|---|---|---|---|---|---|---|
| Session 1 | RB ID 1 | RAB ID 1 | NSAPI 1 | RNC's MAC address | WLAN RB ID 1 | Web browsing |
| Session 2 | RB ID 2 | RAB ID 2 | NSAPI 2 | | | E-mail |
| Session N | RB ID N | RAB ID N | NSAPI N | | | Multimedia download |

In the embodiment wherein the UT 240 executes said routing path handover after having received the first PDP-IP packets, the UT 240 decapsulates the received downlink IP-PDP packets from the LLC/802.11 frames and identifies that the WLAN transmission path is successfully set up since it can receive PDP user data via its WLAN interface. The UT 240 then updates its routing table, i.e. table 5, accordingly by binding the relevant PDP context session identifier, i.e. 3GPP RAB ID 1 to the WLAN RB ID 1. The UT 240 thus terminates its uplink transmission through its UTRAN transmission port 241 and starts to transmits the subsequent uplink PDP IP packets through its WLAN port 242, as LLC/Ethernet 802.11 frames to AP 265. More specifically, in one embodiment, the switch of user plane transmission at the UT 240 comprises the following steps, carried out by the Routing application entity of UT 240:

1. As similarly done by RNC 230 for downlink IP packets, all uplink IP packets that have been encapsulated and cached as PDCP packets at UT 240 before deciding the inter-RAT transmission switch, are transmitted to the RNC 230 using the UTRAN path, i.e., using the allocated UTRAN radio bearers/channels. Such IP packets might be cached because they are waiting for their transmission or that they have been transmitted to RNC but not yet acknowledged. As long as UT 240 receives downlink IP packets from RNC 230 through its UTRAN transmission path, UT's RLC entity acknowledges the packet reception using the UTRAN path, too (in case that RLC acknowledged mode is used).

2. As indicated in the DSAP (Destination Service Access Point) field of the received LLC frames through its WLAN interface, the extracted payload, i.e., downlink PDP IP packets, shall be forwarded to the overlying IP layer at UT.

3. After receiving the first downlink IP packet through its WLAN port 242, the Routing application of UT 240 binds the data session identifier, i.e. the 3GPP RAB ID 1, to the alternative routing identifier, i.e. the WLAN RB ID 1, which means that it stops encapsulating the uplink PDP IP packets with PDCP and instead encapsulates them as LLC/802.11 frames using the UT's 240 WLAN MAC address as source address and RNC's 230 MAC address as destination address. These frames are then sent via the WLAN interface through port 242 to AP 265.

In step 536, the AP 265 transforms the IEEE 802.11 uplink frames from UT 240 to IEEE 802.2 frames and transmits these to the M-L2S 201. The M-L2S 201 then forwards these IEEE 802.2 frames to the RNC 230.

In step 538, the Routing application of RNC 230 extracts the PDP IP packets from the received IEEE 802.2 LLC/Ethernet frames, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's WLAN MAC address (indicated as source address of the Ethernet frames), the WLAN RB ID 1 and the TEID 1 established for the PDP context in question, e.g. as illustrated in Table 4. Thus, the handover of the PDP context session in the up- and downlink from the UTRAN routing path to the WLAN routing path is completed by the RNC 230 in step 538.

Note that the encapsulation of IP packets with GTP-U between RNC 230 and SGSN 220, as well as between SGSN 220 and GGSN 210 remain unchanged at any point in time. No change in addresses of the IP packets is made either. This is advantageous in order to provide session continuity with the remote Internet host or peer and eliminates the delay caused by DHCP (Dynamic Host Protocol Configuration) for assigning a new IP address.

In step 540, in case of an inter-RNC handover for the PDP context session in question, e.g. from RNC 230 to RNC 231 in FIG. 2, the method proceeds to step 542.

In step 542, the RNC MRRM application of RNC 230 investigates whether the target RNC 231 has a corresponding MRRM application installed or not, e.g. by sending a dedicated MRRM request to the RNC 231 and obtaining a specific MRRM acknowledgement message within an established time period in case the RNC 231 has a corresponding MRRM application installed. In case such a MRRM acknowledgement message is received by the RNC 230, then the MRRM application of RNC 230 transmits its updated routing table and/or the MRRM information regarding the relevant PDP context session/s to the RNC MRRM application of the target RNC 231. The MRRM applications of RNC 230 and RNC 231 normally utilise the UMTS RNSAP (Radio Network Subsystem Application) protocol to communicate, but other possibilities exist, e.g. UDP/IP or TCP/IP protocol. Otherwise, i.e. in case no acknowledgement is received by the MRRM application of RNC 230, the MRRM application of RNC 230 signals only conventional RRM information to the target RNC 231, in a conventional manner. This procedure provides a possibility for a smooth inter-RNC handover.

Even though the handover of a PDP context session from a UTRAN routing path to a WLAN routing path has been described above, the invention is applicable also for the handover of a PDP context session, or data session, from a WLAN routing path to a UTRAN routing path, with minor modifications obvious for a person skilled in the art. For instance, in case of a handover from the WLAN routing path to the UTRAN routing path, e.g. if the data session is first established via the WLAN routing path, then the capability message may be sent over the WLAN routing path and may comprise e.g. the WLAN RB ID 1 uniquely identifying said data session and further comprising the IMSI of UT 240, allowing the RNC 230 to set up alternative 3GPP RAB ID and 3GPP RB ID corresponding with the WLAN RB ID QoS requirements and, defining a data session with the UT 240 over the UTRAN path, etc. Furthermore, the invention may be used to simultaneously route PDP packets, or session data, over both the WLAN routing path and the UTRAN routing path, e.g. in order to form a soft handover or to simply enhance the throughput for any reason.

The RNC 230 initiates the handover, and the UT 240 switches its routing path after having received the first PDP-packets as described in steps 531-534 above, but many other possibilities exist. For instance, the UT 240 could initiate the handover and the RNC 230 may switch the routing path after receiving the first up-link PDP packets. The UT/RNC 240/230 may take a handover decision independently of RNC/UT 230/240, and perform a handover independently, and/or may signal a handover decision to the RNC/UT 230/240, e.g. by means of a RRC-message, in order to "synchronise" the handover with the RNC/UT 230/240.

FIG. 6 illustrates an alternative embodiment of a UTRAN-WLAN-integrated network according to the present invention. In this embodiment, a WLAN, comprising the AP 665 and the ML-2S 601, is connected to an IP-network 6050, via an Access Router 6010. Optionally, the IP-Network 6050 may be connected to the RNC 630 through an access router, not illustrated in FIG. 6. The Access Router 6010 is connected to a DHCP (Dynamic Host Configuration Protocol) server 6015, which may be integrated with the RNC 630. In FIG. 6, the RNC 630 is connected with the base station node B 650 via port 6002, forming a UTRAN routing path. The M-L2S 601 is connected to the Access Point, AP, 265, however, many possibilities exist. A plurality of AP:s may e.g. be connected directly to the Access router 6010 or to a plurality of intermediate M-L2S:s connected to the Access router 6010. There may be several M-L2S:s in the routing path between an AP and an M-L2S. Normally, in order to facilitate distributing or multicasting layer 2 messages within the WLAN, the Access router 6010 is connected to the WLAN through one single M-L2S. The RNC 630 is normally connected to further RNC:s in a conventional manner, not shown in FIG. 6, which in turn may be connected to their respective WLAN:s, e.g. via M-L2S:s or IP-networks via Access routers. The RNC 630 is connected to the SGSN 620. The SGSN 620 is connected to the GGSN 610 which in turn is connected to the Internet 670. According to the invention, the RNC 630 is further connected with the IP-network 6050 through the RNC data port 2003. The AP 665 is connected with the M-L2S 601. The dual mode/capability UT 640 can establish a WLAN radio connection with the layer 2 WLAN network through its WMAC (Wireless Media Access Control) port 642.

Figure 7:
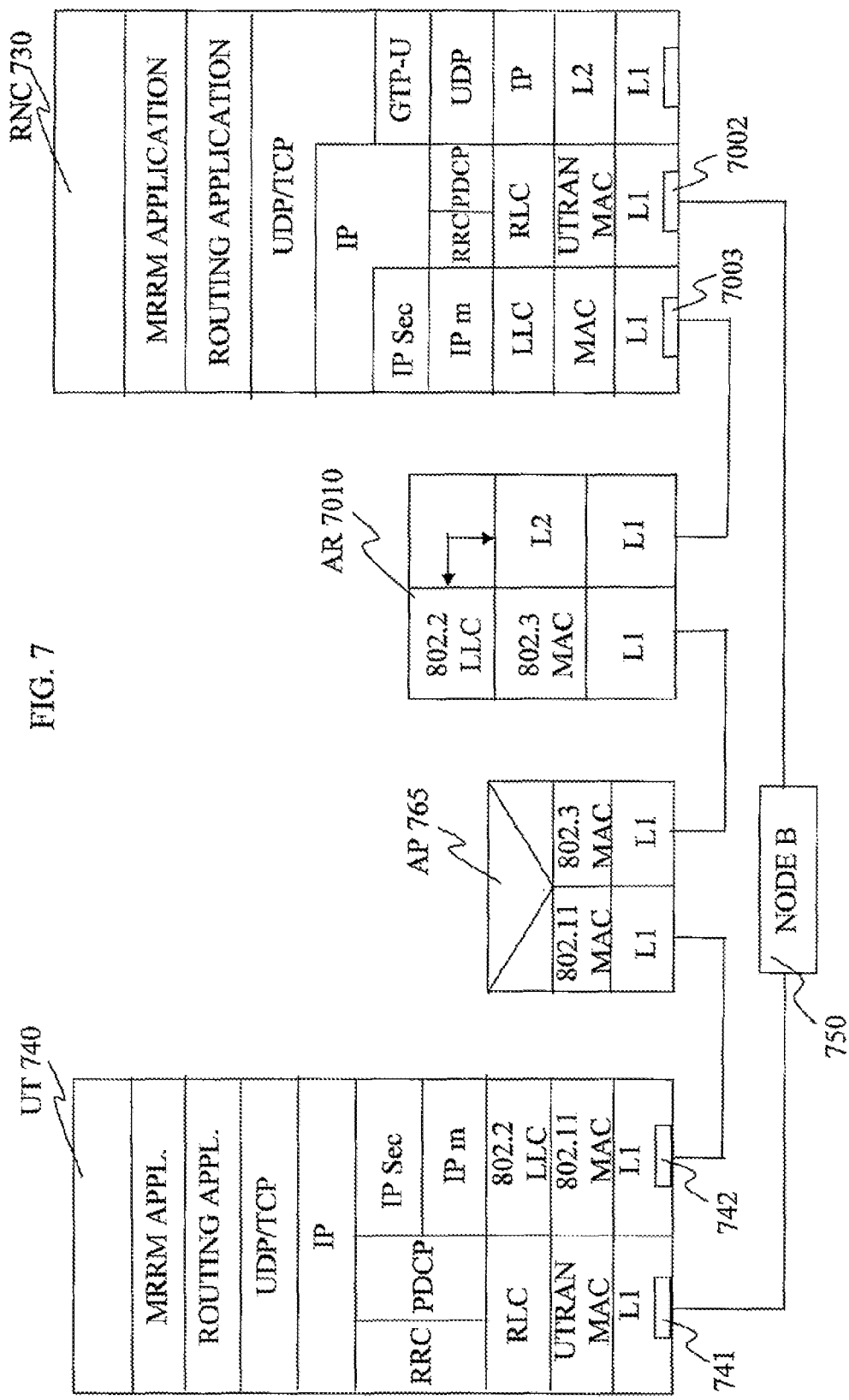
FIG. 7 illustrates an example of the protocol stacks and software applications of the network illustrated in FIG. 6.

FIG. 7 illustrates an example of the protocol stacks and applications which according to the invention are used by the RNC 630, the Access router 6010, the AP 665 and the UT 640 in FIG. 6. The M-L2S 601 in FIG. 6 normally acts as an AP, the IP-Network 6050 relays IP-packets to/from Access Router 6010 from/to RNC 630, these are therefore left out in FIG. 7. As illustrated in FIG. 7, the RNC 730 has conventional UTRAN protocol stack installed, comprising UTRAN MAC protocol, associated with port 7002, RLC protocol, PDCP/RRC protocols, GTP-U protocol, IP and UDP/TCP. According to the invention, the RNC 730 further has a MRRM application and a Routing application installed. According to the invention, the RNC 730 further has a conventional layer one and MAC layer installed associated with data port 7003, enabling the RNC 730 to communicate with the Access Router 7010. The UT 740 has a conventional UTRAN protocol, comprising a UTRAN physical layer, a MAC layer, RLC layer, and a PDCP/RRC protocol layer. According to the invention, the UT 340 has also an Ethernet- and WLAN-protocol stack installed, i.e. an IEEE 802.11 physical layer, MAC layer and 802.2 LLC layer, a IPm protocol (mobile IP) and optionally also an IPSec protocol, as illustrated in FIG. 7. The IPm and IPSec protocols may also be integrated. According to the invention, the UT 740 has further an IP-layer, a UDP/TCP layer, and a Routing application and a MRRM application installed "on top" of the UDP/TCP layer, as illustrated in FIG. 7. In a similar manner, the RNC 730 has an IPm and an IPSec protocol, and a MRRM application and a Routing application are installed "on top" of a UDP/TCP layer, as illustrated in FIG. 7. The MRRM and Routing application of the UT 740 and of the RNC 230 can communicate with each other by conventional layer data processing.

FIGS. 8A-C illustrates the method according to the invention for the embodiment illustrated in FIGS. 6 and 7.

Referring to FIGS. 8A-C, the method according to the invention starts in step 810, wherein a PDP context data session is set up between the UT 640 and the GGSN 610 enabling a data communication session between the UT 640 and e.g. an Internet host or a peer connected to the Internet. The PDP context session is set up in a conventional manner, e.g. as described above.

In step 811, data of said PDP context session are routed over the first routing path, i.e. the UTRAN routing path, in a conventional manner as described in step 511 above.

In step 812, the MRRM application of RNC 630 sends its alternative network source address, NSA, i.e. the IP address of RNC 630, to the MRRM application of UT 640, e.g. over the downlink UTRAN-DCCH. In an alternative embodiment, the RNC does not send its NSA in step 812, instead the RNC's 630 IP-address is known by the DHCP server (pre-stored) and the RNC's 630 IP-address is instead included e.g. in the DHCP Acknowledge message described below in step 823.

In step 813, the MRRM of UT 640 updates the routing table of the UT Routing application by associating the PDP context session/s with the received NSA, i.e. the IP address of RNC in this case, as illustrated in table 6 and creates an alternative routing identifier for the relevant data session, i.e. a WIP RB ID, and associates it with port 642. The WIP RB ID 1 is associated with the IP address of RNC 630.

TABLE 6

| PDP Session | 3GPP RB ID | 3GPP RAB ID | NSA | WIP RB ID | Application |
|---|---|---|---|---|---|
| Session 1 | RB ID 1 | RAB ID 1 | IP-address of RNC | WIP RB ID 1 | Web browsing |

TABLE 6-continued

| PDP Session | 3GPP RB ID | 3GPP RAB ID | NSA | WIP RB ID | Application |
|---|---|---|---|---|---|
| Session 2 | RB ID 2 | RAB ID 2 | IP-address of RNC | | E-mail |
| Session N | RB ID N | RAB ID N | IP-address of RNC | | Multimedia download |

In step 820, the Routing application of UT 640 detects the WLAN (broadcast) beacon signal from AP 665, and the UT establishes a radio connection with the WLAN via said second port (642), as described in step 522 above. The WLAN forwards update frames to the Access Router 6010, and the bridging tables of the WLAN and the Access router 6010 are updated accordingly, in a conventional manner.

In step 823, the UT 640 obtains a second IP address from the DHCP server 6015, in addition to its already assigned PDP context session IP address. This requires that the UT 640 has a DHCP client installed. The assignment of a second IP-address to the UT 640 is normally carried out in the following way:

1. The UT 240 broadcasts a DHCP Discover message as a DHCP/UDP/IP message.
2. The DHCP Server 6015 responds the UT 640 by sending a DHCP Offer message, which comprises a second IP address for the UT 240 as a DHCP/UDP/IP message. In case the broadcasted Discover message reaches several DHCP Servers, there may be multiple DHCP Offers sent by different DHCP Servers. The second IP address is normally an IP-address dedicated for mobile applications, i.e. an IPm address.
3. The UT 240 broadcasts a DHCP Request message (i.e. a request for one of the offered IP addresses from one DHCP server) as a DHCP/UDP/IP message.
4. The DHCP Server 6015 sends a DHCP Acknowledge message (i.e. acknowledges a reserved IP address and configuration for the UT 640) as a DHCP/UDP/IP message to the UT 240 which observes this acknowledgment and stores the reserved (second) IP address for future use. This second IP address is forwarded to the UT RRC application, which associates this second IP address with the relevant PDP context session/s. Optionally, the DHCP Acknowledge message may also comprise the RNC's 630 IP-address, if known to the DHCP server, 6015.

In step 825, the MRRM application of UT 640 forms and sends an association message to the MRRM application of RNC 630. The association message comprises the alternative network address of UT 640, i.e. the second IP-address in this case, and also functions as a capability message as described above. In one embodiment, the association message further comprises a session identifier uniquely identifying the data session, e.g. the 3GPP RB ID 1 or the 3GPP RAB ID 1, uniquely identifying the specific PDP data context session established in step 810. In this way, the UT 640 can control which PDP context session/s, among a set of ongoing POP context session/s, for which a handover may be desirable. This may be accomplished by letting the UT 640 send said association message over the UTRAN path exploiting said 3GPP RB ID and 3GPP RAB ID, so that the RNC 630 can extract said 3GPP RB ID and 3GPP RAB ID, which uniquely identify the specific PDP context session. Alternatively, the association message may be sent over the WLAN-IP-Network path as a TCP/IP packet addressed to the RNC's 630 MRRM application. In one embodiment, the DHCP server 6015 sends an association message to the RNC 630 comprising the UT's 640 MAC address and second IP-address. This message may be a dedicated message if the RNC's 630 IP-address is known (pre-stored) to the DHCP-server, or may be multicasted.

In step 826, the RNC 230 receives said association message sent in step 825 and creates an alternative routing identifier, in form of a specific IP network radio bearer identity for the specific PDP context session in this case, i.e. a IPN RB ID 1 as illustrated in Table 4 below, and associates this IPN RB ID 1 with the NA, i.e. the second IP address of the UT 240, and also associates the IPN RB ID 1 with port 2003. The RNC 630 associates said PDP context session (i.e. the relevant session in question) with said NA (UT's 640 second IP address), said alternative routing identifier, i.e. IPN RB ID 1, and port 2003, e.g. by updating its routing table as illustrated in Table 7. In a similar manner as for the 3GPP RB ID and WLAN RB ID, the IPN RB ID defines a connection over the IP-network-WLAN-network path, and comprises e.g. the identical QoS requirements, i.e. bandwidth requirements, max packet delay requirement, requirements regarding BER, FER etc, as the corresponding 3GPP RB ID, in order for the lower layers to realise a data connection between the Routing applications of RNC 630 and the UT 640.

TABLE 7

| PDP Session | 3GPP RB ID | 3GPP RAB ID | UT | TEID | IPN RB ID | NA | Data Port | GTP-U |
|---|---|---|---|---|---|---|---|---|
| Session 1 | RB ID 1 | RAB ID 1 | UT 1 | TEID 1 | IPN RB ID 1 | UT's second IP-address | 6003 | GTP-U 1 |
| Session 2 | RB ID 2 | RAB ID 2 | UT 1 | TEID 2 | | | | GTP-U 2 |
| Session N | RB ID N | RAB ID N | UT K | TEID N | | | | GTP-U N |

The Routing application of RNC 630 continues to route user data of the PDP context session through the UTRAN radio interface, i.e. via port 6002, by continuing to bind the TEID of the PDP context session to the UTRAN (3GPP) RAB ID and the UTRAN (3GPP) RB ID. In one embodiment, the method then proceeds to step 827. In another embodiment, the method skips step 827 and proceeds directly to step 830.

In step 827, the RNC 630 and UT 640 establish a conventional bi-directional IPSec (IP Secure) connection according to one embodiment, enabling the secure encryption and authentication/integrity protection for the packets to be communicated over the WLAN-IP-network 6050 path. This requires that the RNC 630 and the UT 640 has further a respective IPSec application installed, and is normally carried out by setting up a conventional so called IPSec Security Association (SA) in each direction between the UT 640 and the RNC 630. PDP context packets may thereafter be communicated safely over these IPSec connections. The security association credentials may be exchanged between UT 640 and RNC 630 over a secure (encrypted) established UTRAN (WCDMA) connection. The method then proceeds to step 830.

In step 830, a decision is taken to switch the routing of said PDP context session from said cellular radio network path (UTRAN path), via node B 650 and ports 6002 and 641, to said alternative data network path (WLAN-IP-network path), via ports 6003 and 642. According to the invention, this decision may be taken by the UT 640 or the RNC 630 based on various RRM information. In one embodiment, the MRRM application of RNC 630 receives a RRM message, comprising information regarding e.g. signal strength, QoS, BER, FER, interference level, velocity of UT 640, cell load, radio channel quality, etc. regarding the UTRAN network and/or the WLAN-IP network, from the MRRM application of UT 640. This message may be sent over the UTRAN routing path, e.g. on DCCH, or over the WLAN-IP-network as a TCP/IP message. The MRRM application of UT 640 performs measurements regarding the radio link quality for both the UTRAN link and the WLAN link, so as to form such RRM message/s or measurement reports. Alternatively, RRM-information could be collected by the AP 665 or Access Router 6010 and transmitted to the RNC 630 as a dedicated message (e.g. in form of a modified IAPP message) in case that the dedicated control connection for this purpose exist between the AP and AR and RNC 630, alternatively the AP sends the RRM messages into the alternative wireless data network (e.g. the 802 Layer 2 WLAN network), which forwards them into the IP-network via the AR 6010, which in turn forwards them to the RNC 630. The AR can directly send the RRM messages into the IP-network. The RNC 630 may continously listen for RRM messages (e.g. listening to specific IAPP distribution address for modificated IAPP RRM messages), extract and filter out RRM message related to specific cells (i.e. comprising specific WLAN cell ID) and/or related to specific users (e.g. comprising UT's MAC address or UT's IP address), associated with the RNC 630. The RNC-MRRM application of RNC 630 may take the decision in step 830 to perform a handover from the UTRAN routing path to the WLAN-IP network routing path e.g. if the WLAN-IP network currently offers a better/higher QoS level than the UTRAN or if the traffic load level of the UTRAN network exceeds a specific threshold value, or may decide to maintain the UTRAN routing path e.g. because the velocity of the UT 640 is too high, but many possibilities exist. In an alternative embodiment, the UT MRRM application of UT 640 takes the decision to switch the routing of the PDP context session to the WLAN routing path; e.g. based on said measured MRRM parameter values. What is important is that the invention provides a possibility to provide MRRM functionality in the RNC 630 and/or the UT 640 enabling e.g. handover decisions taking into account the exploitation of the radio resources of both said UTRAN and the WLAN-IP network. In this way, the invention provides a possibility to develop completely new and more efficient MRRM functionality since the RNC 630 and/or UT 640 has access to both UTRAN and WLAN RRM information. In a preferred embodiment, the MRRM application of RNC 630 takes the handover decisions. It should be noted that the invention gives the possible advantage of collecting all the MRRM information in the "right" node, i.e. in the radio network control node, RNC 630, in which the conventional UTRAN RRM-functions are realised.

According to the method of the invention, the method remains in step 830 until a decision has been taken to handover the PDP context session to the WLAN-IP NETWORK routing path, and then proceeds to step 831.

In step 831, in one embodiment, the RNC 630 executes the handover of the PDP context session from the first, i.e. said cellular radio network path, to said alternative, i.e. WLAN-IP network routing path, i.e. switches user plane transmission from the UTRAN path to the WLAN-IP Network path. The handover is executed by the Routing application of RNC 630 which binds the PDP context session identifier, i.e. TEID 1 in this case, to the alternative radio bearer identity, i.e. the IPN RB ID 1 in this case, instead of to the conventional 3GPP RB ID, in table 7, thereby starting to route downlink IP packets of the PDP session through the WLAN-IP Network routing path via port 6003, instead of through the UTRAN path via port 6002. The transmission switch is crucial for the downlink IP packets received by RNC 630 from SGSN 620 through the corresponding GTP-U tunnel. In conventional user plane transmission the RNC decapsulates the IP packets from the GTP-U PDU and encapsulates them with PDCP prior to transmission over UTRAN channels. The invention allow seamless transmission switch without data loss by having the Routing application entity of RNC 630 carrying out the following steps:

1. All downlink IP packets that have already been encapsulated and cached as PDCP packets before the inter-RAT (Radio Access Technology) handover is decided, are transmitted to the UT 640 using the UTRAN path. Such IP packets may be cached at RNC 630 because they are waiting for their transmission or they have been transmitted to UT 640 but have not yet been confirmed. As long as RNC receives uplink IP packets from UT 640 through its UTRAN routing path, the RNC's 630 RLC entity acknowledges the packet reception using the UTRAN path (in case that RLC acknowledged mode is used), according to the invention.

2. In case that an acknowledged mode RLC service is configured in the PDP context for user plane transmission over the UTRAN path, then a conventional acknowledged TCP/IP mode transmission is used between the Routing applications of UT 640 and RNC 630.

3. All downlink IP packets de-capsulated from the GTP-U PDUs after the inter-RAT handover is decided in step 530, are encapsulated as Routing application TCP/IP packets with the UT's 640 second IP address as destination address and RNC's 630 IP address as source address. These frames are then sent through the RNC's 630 port 6003.

The created downlink TCP/IP packets are then transmitted on RNC's 630 port 6003. These are TCP/IP Routing application packets, i.e. the TCP header defines them to be Routing application packets destined for the Routing application of UT 640, comprising the embedded downlink PDP IP packets.

In step 832, the IP-Network and WLAN routes these downlink IP-packets to the UT 640, since their bridging tables are updated accordingly and transmits these to the UT 640.

In step 834, the UT 640 switches the routing path of said PDP context session from the UTRAN routing path to the alternative WLAN-IP NETWORK routing path after receiving the alternative network source address of RNC 630, NSA, i.e. the IP address of RNC 630 in this case. The Routing application of UT 640 updates its routing table by associating the session identifier/s with the RNC's NSA, i.e. the IP address of RNC 630 in this case, as illustrated in table 8 below.

TABLE 8

| PDP Session | 3GPP RB ID | 3GPP RAB ID | NSAPI | NSA of RNC | IPN Radio Bearer ID | Application |
| --- | --- | --- | --- | --- | --- | --- |
| Session 1 | 3GPP RB ID 1 | 3GPP RAB ID 1 | NSAPI 1 | RNC's IP address | IPN RB ID 1 | Web browsing |
| Session 2 | 3GPP RB ID 2 | 3GPP RAB ID 2 | NSAPI 2 | | | E-mail |
| Session N | 3GPP RB ID N | 3GPP RAB ID N | NSAPI N | | | Multimedia download |

The Routing application of UT 640 decapsulates the received downlink IP-PDP packets from the TCP/IP packets The UT 640 then updates its routing table, i.e. table 8, accordingly by binding the relevant PDP context session identifier, i.e. UTRAN RAB ID 1 to the IPN RB ID 1 for uplink IP packet transmission via port 642 instead of UTRAN port 641. The UT 640 thus terminates its uplink transmission through its UTRAN transmission port 641 and starts to transmit the subsequent uplink PDP IP packets through port 642, as TCP/IP frames to the RNC's 630 Routing application. More specifically, in one embodiment, the switch of user plane transmission at the UT 640 comprises the following steps, carried out by the Routing application entity of UT 640:

1. As similarly done by RNC 630 for downlink IP packets, all uplink IP packets that have been encapsulated and cached as PDCP packets at UT 640 before deciding the inter-RAT transmission switch, are transmitted to the RNC 630 using the UTRAN path, i.e., using the allocated UTRAN radio bearers/channels. Such IP packets might be cached because they are waiting for their transmission or that they have been transmitted to RNC but not yet acknowledged. As long as UT 640 receives downlink IP packets from RNC 630 through its UTRAN transmission path, UT's RLC entity acknowledges the packet reception using the UTRAN path, too (in case that RLC acknowledged mode is used).

2. As indicated in the DSAP (Destination Service Access Point) field of the received TCP/IP packets, the extracted payload, i.e., downlink PDP IP packets, shall be forwarded to the overlying IP layer at UT.

3. After receiving the first downlink IP packet through its port 642, the Routing application of UT 640 stops encapsulating the uplink PDP IP packets with PDCP and instead encapsulates them as TCP/IP frames using the UT's 640 second IP address as source address and RNC's 630 IP address as destination address. These frames are then sent through port 642.

In step 836, the WLAN-IP-Network forwards these packets to the RNC 630.

In step 838, the Routing application of RNC 630 extracts the PDP IP packets from the received TCP/IP packets, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's second IP address (indicated as source address of the TCP/IP packets), and the TEID established for the PDP context in question, e.g. as illustrated in Table 7. Thus, the handover of the PDP context session in the up- and downlink from the UTRAN routing path to the WLAN routing path is completed by the RNC 630 in step 838.

Note that the encapsulation of IP packets with GTP-U between RNC 630 and SGSN 620, as well as between SGSN 620 and GGSN 610 remain unchanged at any point in time. This is advantageous in order to provide session continuity with the remote Internet host or peer.

In one embodiment of the invention, the UTRAN radio bearer between UT 640 and RNC 630 will not be released even though no user plane traffic is transmitted over the UTRAN path. This is advantageous since the UTRAN path then can be used for sending MRRM messages regarding the UTRAN and/or the alternative access network, e.g. WLAN or WLAN-IP-Network, throughout the data session. Furthermore, this facilitates a seamless session handover from the alternative routing path back to the UTRAN routing path at a later stage and enables an efficient mobility management, e.g. in case of location area update for the UTRAN etc.

Of course, the handover may first be executed by the UT 640 or the RNC 630, independently, or sonchronously, in a similar manner described with reference to FIG. 5 above. The PDP-packets may also simultaneously be routed over both the routing paths, for any reason. Many possibilities exist, as a person skilled in the art realises.

The above described method according to the invention is normally realised by software/protocol stack/s, stored in a memory and loaded/running in/on processing means, e.g. CPU:s, in UT (240) and RNC (230), as a person skilled in the art realises.

The software (computer program) according to the invention may be stored on a wide range of computer readable mediums such as e.g. CD-ROM:s, flash memories etc, allowing an efficient distribution and installation.

The principles of the present invention have been described in the foregoing by examples of embodiments or modes of operations, i.e. in the case that the L2-RN is a WLAN. However, as already stated, the invention is applicable for any integrated cellular radio network L2-RN and many modifications and/or combinations are possible. For instance, in case the L2-RN comprises a WMAN, IEEE 802.16, then the AP 265 would transform the IEEE 802.3 frames to 802.16 MAC frames instead of 802.11 frames, referring to FIGS. 2, 3, 4 and 5 above, as a person skilled in the art realises. The cellular radio network may be any cellular radio network capale of establishing a data session, e.g. a UTRAN, UMTS-network, a CDMA 2000 network, an IS-95 network, a GPRS network, a D-AMPS network etc. Many modifications and/or combinations are possible. Therefore, the invention should not be construed as being limited to the particular embodiments discussed above, and it should be appreciated that variations may be made in those embodiments by persons skilled in the art, without departing from the scope of the present invention as defined by the appended claims.

What is claimed:

1. A network node for assisting a handover of a data session from a first routing path, associated with a first access network and a first data port of said network node, to an alternative routing path, associated with an alternative access network and a second data port of said network node, said network node being arranged to route data of said data session over said first access network via said first data port, to a User Terminal, UT, by binding a session identifier identifying said data session to a first routing identifier, wherein said session identifier and said first routing identifier are defined in accordance with a standard protocol routing scheme of said first access network; said network node comprising processing means being further arranged to carry out the following steps:

receiving a capability message uniquely identifying said UT according to a standard protocol routing scheme of said first access network and according to an alternative protocol routing scheme of said alternative access network, said capability message indicating that said UT is capable of establishing a data session through said alternative access network, creating an alternative routing identifier for said data session complying with the alternative protocol routing scheme of said alternative access network and associating said alternative routing identifier with said UT and said second data port, associating at least said session identifier with said alternative routing identifier, and receiving from the UT, for the purpose of a handover decision by the network node, either a measurement report, wherein measurements in said measurement report are performed by a Multi Radio Resource Management, MRRM, application provided in the UT, or radio resource management parameter received by the UT from an access point, AP, of the alternative radio access network; or receiving from the UT a handover decision taken by the MRRM application provided in the UT on the basis of radio resource management parameters received from an AP of the alternative radio access network, and/or MRRM parameters measured by the UT.

2. The network node according to claim 1 wherein said first access network is a cellular radio network, said first routing identifier is a radio bearer identity, and wherein said radio bearer identity and said session identifier are defined by a cellular radio network standard protocol routing scheme, and wherein said capability message comprises a network address, NA, associated with said UT, in accordance with a standard protocol routing scheme of said alternative access network.

3. The network node according to claim 2 further arranged to carry out the following steps:
receiving said capability message identifying said data session, and comprising said NA,
associating said data session with said NA.

4. The network node according to claim 2 further arranged to carry out the following steps:
receiving an association message comprising said NA, said association message indicating that there is an established radio communication connection between said UT and said alternative access network associated with said second data port,
associating said NA with said second data port,
creating an alternative radio bearer identity defining a data communication connection between said network node and said UT for said data session, through said alternative access network via said second data port,
defining said alternative routing identifier to be said alternative radio bearer identity,
associating said alternative radio bearer identity with said session identifier, said NA and said second data port,
deciding to route said data session to said UT through said alternative routing path, via said second data port through said alternative access network,
binding said session identifier to said alternative radio bearer identity, thereby routing data of said data session through said alternative routing path, via said second data port through said alternative access network.

5. The network node according to claim 4 wherein said association message uniquely identifies said data session.

6. The network node according to claim 4 further arranged to carry out the following steps:

receiving a radio resource management (RRM) message comprising RRM information regarding said alternative access network and/or said cellular radio network,
extracting said RRM information from said RRM message,
updating stored RRM information with said extracted RRM information,
deciding to route said data session to said UT through said alternative access network routing path based on said updated RRM information.

7. The network node according to claim 6 further arranged to carry out the following step:
extracting said RRM information in said RRM message by means of an installed Inter Access Point Protocol (IAPP) or an installed Internet Protocol (IP).

8. The network node according to claim 4 further arranged to carry out the following steps:
receiving said capability message on said first data port, wherein said capability message uniquely identifies said first radio bearer identity,
establishing that said NA in said capability message is defined as a Wireless Data Network Address (WDNA) in accordance with a standard protocol routing scheme of a Wireless Data Network, and extracting said WDNA from said capability message,
receiving said association message on said second data port, wherein said association message comprises said WDNA.

9. The network node according to claim 8 wherein said standard protocol routing scheme is a protocol according to the IEEE 802 standard protocol family and said NA is a MAC-address of said UT.

10. The network node according to claim 4 wherein said data session is associated with a first IP-address of said UT, said network node further arranged to carry out the following steps:
receiving said capability message on said first data port, wherein said capability message uniquely identifies said first radio bearer identity,
establishing that said NA in said capability message is defined as a second IP-address allocated said UT, and extracting said second IP-address from said capability message,
receiving said association message on said second data port, wherein said association message comprises said second IP-address.

11. The network node according to claim 10 wherein said second IP-address is a mobile IP-address (IPm) and said data session is routed over said alternative data network path by means of an IPSec protocol (Secure IP).

12. The network node according to claim 2 wherein said cellular radio network standard protocol routing scheme is defined by a UTRAN (Universal Terrestrial Radio Access Network) standard protocol, said data session is a PDP (Packet Data Protocol) context session complying with a 3GPP standard, said data session identifier is a 3GPP (3:rd Generation Partnership Project) TEID (Tunnel Endpoint Identifier) of a routing tunnel between said network node and a gateway support node for said data session, and said first radio bearer identity is a Radio Access Bearer Identity (RAB ID) or a Radio Bearer Identity (RB ID) complying with the 3GPP standard.

13. The network node according to claim 1 further arranged to carry out the following steps:
receiving an inter-network node handover request to switch said data session to a second target network node,
transferring at least said alternative routing identifier to said second target network node.

14. The network node of claim 1, wherein the network node is an LTE eNodeB (eNB).

15. A method to be used by a User Terminal, UT, for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, wherein said UT is arranged to route data of said data session to a network node over said first routing path by binding said session identifier to said first routing identifier, said first routing identifier associated with said UT at said network node, said method comprising the following steps:
   forming a capability message uniquely identifying said UT according to a standard protocol routing scheme of said first access network and according to a protocol routing scheme of said alternative radio access network, said capability message indicating that said UT is capable of establishing a data session through said alternative radio access network,
   sending said capability message to said network node over said first or alternative routing path, and
   utilising an MRRM, Multi Radio Resource Management, application provided in the UT for retrieving radio resource management parameters from the alternative network, on which parameters handover decision is based.

16. The method according to claim 15 comprising the step of
   transmitting the retrieved radio resource parameters to the network node on which parameters a handover decision in the network node is based.

17. The method according to claim 15 comprising the steps of
   taking a handover decision in the UT on the basis of the retrieved radio resource management parameters;
   signalling the handover decision to the network node.

18. The method according to claim 15, whereby said radio resource parameters are retrieved by measurements performed by the UT.

19. The method according to claim 15, whereby said radio resource parameters are retrieved by reception of said parameters from an access point, AP, of the alternative radio access network.

20. The method according to claim 15 wherein said first radio access network is a cellular radio network, said alternative radio access network is a wireless data network, said session identifier and said first routing identifier are radio bearer identities defined by a cellular radio network standard protocol routing scheme, and wherein said alternative routing identifier is associated with a network address, NA, of said UT, wherein said NA is defined in accordance with a standard protocol routing scheme of said wireless data network.

21. The method according to claim 20 wherein said capability message is sent to said network node over said first routing path via said first data port.

22. The method according to claim 21, further comprising the following steps:
   forming said capability message so that it comprises said NA and uniquely identifies said data session,
   sending said capability message to said network node.

23. The method according to claim 21 further comprising the following steps:
   establishing a radio communication connection with said alternative wireless data network via said second data port,
   forming an association message comprising said NA, said association message indicating that there is an established radio communication connection between said UT and said alternative radio access network,
   sending said association message to said network node.

24. The method according to claim 23 further comprising the following steps:
   receiving a message comprising a Network Source Address (NSA) associated with said network node and said alternative routing path,
   extracting said NSA from said capability message,
   associating said session identifier with said alternative routing identifier, with said NSA and with said second data port,
   deciding to route data of said data session through said alternative radio access network routing path via said second data port,
   binding said session identifier to said alternative routing identifier, thereby routing data of said data session through said alternative radio access network routing path via said second data port.

25. The method according to claim 24 further comprising the following steps:
   measuring Radio Resource Management, RRM, parameters regarding said alternative wireless data network and/or said cellular radio network,
   forming a RRM message comprising measured parameter values for said RRM parameters,
   sending said RRM message to said network node.

26. The method according to claim 24 wherein said NA and said NSA are MAC network addresses complying with an IEEE 802 standard protocol addressing scheme.

27. The method according to claim 24 wherein said data session is associated with a first IP-address of said UT, said NSA is defined as an IP-address, said method further comprising the following steps:
   receiving, on said second data port, a message comprising a second IP address allocated said UT,
   defining said NA to comprise said second IP-address,
   associating said alternative routing identifier with said second IP-address,
   forming said association message so that it comprises said second IP address and so that it identifies said data session,
   sending said association message to said network node.

28. The method according to claim 27 wherein said second IP-address is a secure IP-address (IPSec) according to an IP-security protocol and said NA is defined as a combination of said second IP-address and a Security Association Identifier.

29. The method of claim 15, wherein the network node is an LTE eNodeB (eNB).

30. A User Terminal, UT, for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, said UT being arranged to route data of said data session to a network node over said first routing path by binding said session identifier to said first routing identifier, wherein said first routing identifier is associated with said UT at said network node wherein said UT is operative to:
- form a capability message uniquely identifying said UT according to a standard protocol routing scheme of said first access network and according to a protocol routing scheme of said alternative radio access network, said capability message indicating that said UT is capable of establishing a data session through said alternative radio access network,
- send said capability message to said network node over said first or alternative routing path, and
- utilize an MRRM, Multi Radio Resource Management, application provided in the UT for retrieving radio resource management parameters from the alternative network, on which parameters handover decision is based.

31. The User Terminal of claim 30, wherein the network node is an LTE eNodeB (eNB).

32. A non-transitory computer readable medium having stored program code means which, when loaded into a processing means of a User Terminal, UT, make said processing means execute at least one procedure for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, wherein said UT is arranged to route data of said data session to a network node over said first routing path by binding said session identifier to said first routing identifier, said first routing identifier associated with said UT at said network node, said procedure comprising:
- forming a capability message uniquely identifying said UT according to a standard protocol routing scheme of said first access network and according to a protocol routing scheme of said alternative radio access network, said capability message indicating that said UT is capable of establishing a data session through said alternative radio access network,
- sending said capability message to said network node over said first or alternative routing path, and
- utilising an MRRM, Multi Radio Resource Management, application provided in the UT for retrieving radio resource management parameters from the alternative network, on which parameters handover decision is based.

33. The non-transitory computer readable medium of claim 32, wherein the network node is an LTE eNodeB (eNB).

34. A method to be used by a network node for assisting a handover of a data session from a first routing path, associated with a first access network and a first data port of said network node, to an alternative routing path, associated with an alternative access network and a second data port of said network node, wherein said network node is arranged to route data of said data session over said first access network via said first data port, to a User Terminal, UT, by binding a session identifier identifying said data session to a first routing identifier, wherein said session identifier and said first routing identifier are defined in accordance with a standard protocol routing scheme of said first access network, said method comprising the following steps:
- receiving a capability message uniquely identifying said UT according to a standard protocol routing scheme of said alternative access network, said capability message indicating that said UT is capable of communicating data of said data session through said alternative access network,
- creating an alternative routing identifier for said data session complying with the standard protocol routing scheme of said alternative access network and associating said alternative routing identifier with said UT and said second data port,
- associating at least said session identifier with said alternative routing identifier, and
- utilising an MRRM, Multi Radio Resource Management, application provided in the UT for providing the network node with radio resource management parameters received from an AP of the alternative radio access network, and/or MRRM parameters measured by the UT, on which parameters a handover decision in the network node is based, or,
- utilising the MRRM application provided in the UT for taking a handover decision in the UT on the basis of radio resource management parameters received from an AP of the alternative radio access network, and/or MRRM parameters measured by the UT.

35. The method according to claim 34 wherein said first access network is a cellular radio network, said first routing identifier is a first radio bearer identity, and wherein said first radio bearer identity and session identifier are defined by a cellular radio network standard protocol routing scheme, and wherein said capability message comprises a network address, NA, associated with said UT, in accordance with said standard protocol routing scheme of said alternative access network.

36. The method according to of claim 35 further comprising the following steps:
- receiving a message identifying said data session, and comprising said NA,
- associating said data session with said NA.

37. The method according to any claim 35 further comprising the following steps:
- receiving an association message comprising said NA, said association message indicating that there is an established radio communication connection between said UT and said alternative access network associated with said second data port,
- associating said NA with said second data port,
- creating an alternative radio bearer identity defining a data communication connection between said network node and said UT for said data session, through said alternative access network via said second data port,
- defining said alternative routing identifier to be said alternative radio bearer identity,
- associating said session identifier with said alternative radio bearer identity, said NA and said second data port,
- deciding to route said data session to said UT through said alternative routing path, via said second data port through said alternative access network,
- binding said session identifier to said alternative radio bearer identity, thereby routing data of said data session through said alternative routing path, via said second data port through said alternative access network.

38. The method according to claim 37 further comprising the following steps:

receiving a radio resource management (RRM) message comprising RRM information regarding said alternative access network and/or said cellular radio network, extracting said RRM information from said RRM message, updating stored RRM information with said extracted RRM information, deciding to route said data session to said UT through said alternative access network routing path based on said updated RRM information.

39. The method according to claim 38 further comprising the following step:

extracting said RRM information in said RRM message by means of an installed Inter Access Point Protocol (IAPP) or an installed Internet Protocol (IP).

40. The method according to claim 37 further comprising the following steps:

receiving said capability message on said first data port, wherein said capability message uniquely identifies said first radio bearer identity, establishing that said NA in said capability message is defined as a Wireless Data Network Address (WDNA) in accordance with a standard protocol routing scheme of a Wireless Data Network, and extracting said WDNA from said capability message, receiving said association message on said second data port, wherein said association message comprises said WDNA.

41. The method according to claim 40 wherein said standard protocol routing scheme of said alternative network is a protocol according to an IEEE 802 standard protocol family and said NA is a MAC-address of said UT.

42. The method according to claim 37 wherein said data session is associated with a first IP-address of said UT, said method further comprising the following steps:

receiving said capability message on said first data port, wherein said capability message uniquely identifies said first radio bearer identity, establishing that said NA in said capability message is defined as a second IP-address allocated said UT, and extracting said second IP-address from said capability message, receiving said association message on said second data port, wherein said association message comprises said second IP-address.

43. The method according to claim 42 wherein said IP-address is a mobile IP-address (IPm) and said standard protocol routing scheme of said alternative data network is an Internet Protocol for mobile applications (MIP).

44. The method according to claim 35 wherein said cellular radio network standard protocol routing scheme is defined by a UTRAN (Universal Terrestrial Radio Access Network) standard protocol, said data session is a PDP (Packet Data Protocol) context session complying with a 3GPP standard, said data session identifier is a 3GPP (3:rd Generation Partnership Project) TEID (Tunnel Endpoint Identifier) of a routing tunnel between said network node and a gateway support node for said data session, and said first radio bearer identity is a Radio Access Bearer Identity (RAB ID) or a Radio Bearer Identity (RB ID) complying with the 3GPP standard.

45. The method according to claim 34 further comprising the following steps:

receiving an inter-network node handover request to switch said data session to a second target network node, transferring at least said alternative routing identifier to said second network node.

46. The method of claim 34, wherein the network node is an LTE eNodeB (eNB).

47. A non-transitory computer readable medium having stored program code means which, when loaded into a processing means of a network node make said processing means execute at least one procedure for assisting a handover of a data session from a first routing path, associated with a first access network and a first data port of said network node, to an alternative routing path, associated with an alternative access network and a second data port of said network node, wherein said network node is arranged to route data of said data session over said first access network via said first data port, to a User Terminal, UT, by binding a session identifier identifying said data session to a first routing identifier, wherein said session identifier and said first routing identifier are defined in accordance with a standard protocol routing scheme of said first access network, said procedure comprising:

receiving a capability message uniquely identifying said UT according to a standard protocol routing scheme of said alternative access network, said capability message indicating that said UT is capable of communicating data of said data session through said alternative access network, creating an alternative routing identifier for said data session complying with the standard protocol routing scheme of said alternative access network and associating said alternative routing identifier with said UT and said second data port, associating at least said session identifier with said alternative routing identifier, and utilising an MRRM, Multi Radio Resource Management, application provided in the UT for providing the network node with radio resource management parameters received from an AP of the alternative radio access network, and/or MRRM parameters measured by the UT, on which parameters a handover decision in the network node is based, or, utilising the MRRM application provided in the UT for taking a handover decision in the UT on the basis of radio resource management parameters received from an AP of the alternative radio access network, and/or MRRM parameters measured by the UT.

48. The non-transitory computer readable medium of claim 47, wherein the network node is an LTE eNodeB (eNB).

49. A network node for assisting a handover of a data session from a first routing path, associated with a first access network and a first data port of said network node, to an alternative routing path, associated with an alternative access network and a second data port of said network node, said network node being arranged to route data of said data session over said first access network via said first data port, to a User Terminal, UT, by binding a session identifier identifying said data session to a first routing identifier, wherein said session identifier and said first routing identifier are defined in accordance with a standard protocol routing scheme of said first access network; said network node comprising processing means being further arranged to carry out the following steps:

receiving a capability message uniquely identifying said UT according to a standard protocol routing scheme of said first access network and according to an alternative protocol routing scheme of said alternative access network, said capability message indicating that said UT is capable of establishing a data session through said alternative access network, creating an alternative routing identifier for said data session complying with the alternative protocol routing scheme of said alternative access network and associating said alternative routing identifier with said UT and said second data port, associating at least said session identifier with said alternative routing identifier, and receiving from the UT, for the purpose of a handover decision by the network node, either a measurement report, wherein measurements in said measurement report are performed by a Multi Radio Resource Management, MRRM, application provided in the UT, or radio resource management parameter received by the UT from an AP of the alternative radio access network; or receiving from the UT a handover decision taken by the MRRM application provided in the UT on the basis of radio resource management parameters received from an AP of the alternative radio access network, and/or MRRM parameters measured by the UT, wherein said first access network is a cellular radio network, said first routing identifier is a radio bearer identity, and wherein said radio bearer identity and said session identifier are defined by a cellular radio network standard protocol routing scheme, and wherein said capability message comprises a network address, NA, associated with said UT, in accordance with a standard protocol routing scheme of said alternative access network, said processing means further arranged to carry out the following steps:

receiving an association message comprising said NA, said association message indicating that there is an established radio communication connection between said UT and said alternative access network associated with said second data port, associating said NA with said second data port, creating an alternative radio bearer identity defining a data communication connection between said network node and said UT for said data session, through said alternative access network via said second data port, defining said alternative routing identifier to be said alternative radio bearer identity, associating said alternative radio bearer identity with said session identifier, said NA and said second data port, deciding to route said data session to said UT through said alternative routing path, via said second data port through said alternative access network, and binding said session identifier to said alternative radio bearer identity, thereby routing data of said data session through said alternative routing path, via said second data port through said alternative access network.

50. The network node of claim 49, wherein the network node is an LTE eNodeB (eNB).

51. A method to be used by a User Terminal, UT, for assisting a handover of a data session from a first routing path associated with a first radio access network and a first data port of said UT, to an alternative routing path associated with an alternative radio access network and a second data port of said UT, said data session uniquely identified by a session identifier at said UT, said first data port associated with a first routing identifier according to a first radio access network standard protocol routing scheme, said second data port associated with an alternative routing identifier according to an alternative radio access network protocol routing scheme, wherein said UT is arranged to route data of said data session to a network node over said first routing path by binding said session identifier to said first routing identifier, said first routing identifier associated with said UT at said network node, said method comprising the following steps:

forming a capability message uniquely identifying said UT according to a standard protocol routing scheme of said first access network and according to a protocol routing scheme of said alternative radio access network, said capability message indicating that said UT is capable of establishing a data session through said alternative radio access network, sending said capability message to said network node over said first or alternative routing path, utilising an MRRM, Multi Radio Resource Management, application provided in the UT for retrieving radio resource management parameters from the alternative radio access network, on which parameters handover decision is based, wherein said first radio access network is a cellular radio network, said alternative radio access network is a wireless data network, said session identifier and said first routing identifier are radio bearer identities defined by a cellular radio network standard protocol routing scheme, and wherein said alternative routing identifier is associated with a network address, NA, of said UT, wherein said NA is defined in accordance with a standard protocol routing scheme of said wireless data network, wherein said capability message is sent to said network node over said first routing path via said first data port, said method further comprising the following steps:

establishing a radio communication connection with said alternative radio access network via said second data port, forming an association message comprising said NA, said association message indicating that there is an established radio communication connection between said UT and said alternative radio access network, sending said association message to said network node, receiving a message comprising a Network Source Address (NSA) associated with said network node and said alternative routing path, extracting said NSA from said capability message, associating said session identifier with said alternative routing identifier, with said NSA and with said second data port, deciding to route data of said data session through said alternative radio access network routing path via said second data port, and binding said session identifier to said alternative routing identifier, thereby routing data of said data session through said alternative radio access network routing path via said second data port.

52. The method of claim 51, wherein the network node is an LTE eNodeB (eNB).

53. A method to be used by a network node for assisting a handover of a data session from a first routing path, associated with a first access network and a first data port of said network node, to an alternative routing path, associated with an alternative access network and a second data port of said network node, wherein said network node is arranged to route data of said data session over said first access network via said first data port, to a User Terminal, UT, by binding a session identifier identifying said data session to a first routing identifier, wherein said session identifier and said first routing identifier are defined in accordance with a standard protocol routing scheme of said first access network, said method comprising the following steps:

receiving a capability message uniquely identifying said UT according to a standard protocol routing scheme of said alternative access network, said capability message indicating that said UT is capable of communicating data of said data session through said alternative access network, creating an alternative routing identifier for said data session complying with the standard protocol routing scheme of said alternative access network and associating said alternative routing identifier with said UT and said second data port, associating at least said session identifier with said alternative routing identifier, and utilising an MRRM, Multi Radio Resource Management, application provided in the UT for providing the network node with radio resource management parameters received from an AP of the alternative radio access network, and/or MRRM parameters measured by the UT, on which parameters a handover decision in the network node is based, or, utilising the MRRM application provided in the UT for taking a handover decision in the UT on the basis of radio resource management parameters received from an AP of the alternative radio access network, and/or MRRM parameters measured by the UT, wherein said first access network is a cellular radio network, said first routing identifier is a radio bearer identity, and wherein said radio bearer identity and session identifier are defined by a cellular radio network standard protocol routing scheme, and wherein said capability message comprises a network address, NA, associated with said UT, in accordance with said standard protocol routing scheme of said alternative access network, said method further comprising the following steps:

receiving an association message comprising said NA, said association message indicating that there is an established radio communication connection between said UT and said alternative access network associated with said second data port, associating said NA with said second data port, creating an alternative radio bearer identity defining a data communication connection between said network node and said UT for said data session, through said alternative access network via said second data port, defining said alternative routing identifier to be said alternative radio bearer identity, associating said session identifier with said alternative radio bearer identity, said NA and said second data port, deciding to route said data session to said UT through said alternative routing path, via said second data port through said alternative access network, and binding said session identifier to said alternative radio bearer identity, thereby routing data of said data session through said alternative routing path, via said second data port through said alternative access network.

54. The method of claim 53, wherein the network node is an LTE eNodeB (eNB).

\* \* \* \* \*

UNITED STATES PATENT AND TRADEMARK OFFICE
CERTIFICATE OF CORRECTION

PATENT NO. : 8,948,137 B2
APPLICATION NO. : 13/198116
DATED : February 3, 2015
INVENTOR(S) : Sachs et al.

It is certified that error appears in the above-identified patent and that said Letters Patent is hereby corrected as shown below:

In the Specification

In Column 5, Line 1, delete "sent to," and insert -- sent to --, therefor.

In Column 7, Line 56, delete "port;" and insert -- port, --, therefor.

In Column 8, Line 35, delete "claims 1-40." and insert -- claims. --, therefor.

In Column 8, Line 51, delete "applications" and insert -- software applications --, therefor.

In Column 10, Lines 46-47, delete "RAB 18" and insert -- RAB ID --, therefor.

In Column 13, Line 64, delete "carry but" and insert -- carry out --, therefor.

In Column 22, Line 48, delete "Protocol Configuration)" and insert -- Configuration Protocol) --, therefor.

In Column 22, Line 66, delete "Application)" and insert -- Application Part) --, therefor.

In Column 23, Line 20, delete "and," and insert -- and --, therefor.

In Column 26, Line 2, delete "ongoing POP" and insert -- ongoing PDP --, therefor.

In Column 27, Line 33, delete "continously" and insert -- continuously --, therefor.

In Column 30, Line 18, delete "sonchronously," and insert -- synchronously, --, therefor.

In Column 30, Line 42, delete "capale" and insert -- capable --, therefor.

Signed and Sealed this
Fourteenth Day of July, 2015

Michelle K. Lee
*Director of the United States Patent and Trademark Office*

CERTIFICATE OF CORRECTION (continued)
U.S. Pat. No. 8,948,137 B2

In the Claims

In Column 36, Line 38, in Claim 36, delete "to of" and insert -- to --, therefor.

In Column 36, Line 43, in Claim 37, delete "to any" and insert -- to --, therefor.